(12) United States Patent
Hsu et al.

(10) Patent No.: US 11,698,665 B2
(45) Date of Patent: Jul. 11, 2023

(54) MULTI-POSITION HINGE WITH DOUBLE AXLES

(71) Applicant: FOSITEK CORPORATION, New Taipei (TW)

(72) Inventors: An-Szu Hsu, New Taipei (TW); Chun-Han Lin, New Taipei (TW); Yung-Chih Tseng, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 220 days.

(21) Appl. No.: 17/390,269

(22) Filed: Jul. 30, 2021

(65) Prior Publication Data

US 2022/0390989 A1    Dec. 8, 2022

(30) Foreign Application Priority Data

Jun. 2, 2021   (TW) ................................ 110120028

(51) Int. Cl.
  *G06F 1/16*    (2006.01)
  *F16C 11/04*   (2006.01)
  *E05D 11/08*   (2006.01)
  *E05D 3/12*    (2006.01)
  *E05D 3/18*    (2006.01)

(52) U.S. Cl.
  CPC ............ *G06F 1/1681* (2013.01); *F16C 11/04* (2013.01); *E05D 3/122* (2013.01); *E05D 3/18* (2013.01); *E05D 11/087* (2013.01); *E05Y 2900/606* (2013.01)

(58) Field of Classification Search
  CPC . F16C 11/04; E05D 3/122; E05D 3/18; E05D 11/087; E05Y 2900/606
  See application file for complete search history.

(56) References Cited

U.S. PATENT DOCUMENTS

| | | | |
|---|---|---|---|
| 8,776,319 B1* | 7/2014 | Chang | G06F 1/1681 16/303 |
| 9,290,976 B1* | 3/2016 | Horng | G06F 1/1618 |
| 9,309,705 B2* | 4/2016 | Hsu | E05D 3/122 |
| 9,617,770 B1* | 4/2017 | Lin | E05D 11/082 |
| 10,352,354 B1* | 7/2019 | Hsu | G06F 1/1641 |
| 10,480,226 B1* | 11/2019 | Chen | G06F 1/1681 |
| 11,598,365 B2* | 3/2023 | Lin | G06F 1/1681 |
| 2009/0070961 A1* | 3/2009 | Chung | G06F 1/1681 16/354 |

(Continued)

*Primary Examiner* — Victor D Batson
*Assistant Examiner* — Matthew J Sullivan
(74) *Attorney, Agent, or Firm* — Burris Law, PLLC

(57) ABSTRACT

A multi-position hinge includes a base seat, a first axle, a second axle and a sliding assembly. The first and second axles rotatably extend through the base seat in a first direction and are spaced apart from each other in a second direction. The first axle has a first recess, a second recess and a first gear portion. The second axle has a third recess, a fourth recess and a second gear portion corresponding with the first recess, the second recess and the first gear portion, respectively. The sliding assembly includes a first sliding member engageable with the first and third recesses, and a second sliding member engageable with the second and fourth recesses. The first and second axles are rotatable in turn and then rotated synchronously to perform multi-position shifting.

11 Claims, 21 Drawing Sheets

(56) References Cited

U.S. PATENT DOCUMENTS

| | | | |
|---|---|---|---|
| 2016/0032633 A1* | 2/2016 | Hsu | E05D 3/122 |
| | | | 16/368 |
| 2019/0204878 A1* | 7/2019 | Lin | E05D 11/082 |
| 2019/0243426 A1* | 8/2019 | Morrison | G06F 1/1618 |
| 2020/0019218 A1* | 1/2020 | Shen | G06F 1/1679 |
| 2022/0035421 A1* | 2/2022 | Yao | G06F 1/1652 |
| 2022/0100239 A1* | 3/2022 | Siddiqui | G06F 1/1618 |
| 2022/0113771 A1* | 4/2022 | Wu | G06F 1/1616 |
| 2022/0120124 A1* | 4/2022 | Quynh | F16C 11/04 |
| 2022/0179459 A1* | 6/2022 | Wang | F16C 11/045 |
| 2022/0361350 A1* | 11/2022 | Jung | F16C 11/04 |
| 2022/0377919 A1* | 11/2022 | Zhang | G06F 1/1681 |

* cited by examiner

MULTI-POSITION HINGE WITH DOUBLE AXLES

CROSS-REFERENCE TO RELATED APPLICATION

This application claims priority of Taiwanese Patent Application No. 110120028, filed on Jun. 2, 2021.

FIELD

The disclosure relates to a hinge for an electronic device, and more particularly to a multi-position hinge with double axles.

BACKGROUND

A conventional hinge is often used in an electronic device such as a notebook computer, and is mounted on two casing parts of the electronic device for pivot rotation of the casing parts relative thereto. Such electronic device has different design requirements for the pivot rotation of the two casing parts, such as a requirement for performing multi-position rotation to provide an operating feel at each multiple rotational position to the user or to enhance other functions of the electronic device. Therefore, it is desired to provide a hinge enabled to perform pivot rotation and be retained at multiple rotational positions.

SUMMARY

Therefore, an object of the disclosure is to provide a multi-position hinge that can alleviate at least one of the drawbacks of the prior art.

According to the disclosure, the multi-position hinge includes a base seat, a first axle, a second axle and a sliding assembly. The first axle extends through the base seat in a first direction and is rotatable relative to the base seat about a first axis in the first direction. The first axle has a first gear portion which is formed in a circumferential direction of the first axis. The second axle extends through the base seat in the first direction and is rotatable relative to the base seat about a second axis in the first direction. The second axle is spaced apart from the first axle in a second direction which is transverse to the first direction, and has a second gear portion which is formed in a circumferential direction of the second axis. The sliding assembly is interposed between the first axle and the second axle and is disposed on and slidable relative to the base seat in the second direction. The sliding assembly includes a first sliding member and a second sliding member. The first axle is rotatable relative to the base seat among a first initial angular position, a first transit angular position and a first terminate angular position. The second axle is rotatable relative to the base seat among a second initial angular position, a second transit angular position and a second terminate angular position.

During the rotation of the first axle from the first initial angular position to the first terminate angular position along a first rotational direction, and during the rotation of the second axle from the second initial angular position to the second terminate angular position along a second rotational direction that is opposite to the first rotational direction, when the first axle is in the first initial angular position and the second axle is in the second initial angular position, the second axle is obstructed by the second sliding member from rotation in the second rotational direction, and the first gear portion is free from gearing connection with the second gear portion. When the first axle is in other angular positions between the first initial angular position and the first transit angular position and the second axle is in the second initial angular position, the second axle is obstructed by the second sliding member from rotation in the second rotational direction, and the first gear portion is free from gearing connection with the second gear portion. When the first axle is in the first transit angular position and the second axle is in the second initial angular position, the first axle is obstructed by the first sliding member from rotation in the first rotational direction, and the first gear portion is free from gearing connection with the second gear portion. When the first axle is in the first transit angular position and the second axle is in other angular positions between the second initial angular position and the second transit angular position, the first axle is obstructed by the first sliding member from rotation in the first rotational direction, and is obstructed by the second sliding member from rotation in the second rotational direction, and the first gear portion is free from gearing connection with the second gear portion. When the first axle is in the first transit angular position and the second axle is in the second transit angular position, the first axle is obstructed by the second sliding member from rotation in the second rotational direction, and the first gear portion is made to be in gearing connection with the second gear portion. When the first axle is in other angular positions between the first transit angular position and the first terminate angular position and the second axle is in other angular positions between the second transit angular position and the second terminate angular position, the first gear portion is made to be in gearing connection with the second gear portion. When the first axle is in the first terminate angular position and the second axle is in the second terminate angular position, the first gear portion is made to be in gearing connection with the second gear portion.

With the first axle and the second axle operatively connected with the first sliding member and the second sliding member, and with the operative connection between the first gear portion of the first axle and the second gear portion of the second axle, during the rotating shift of the hinge, the first axle and the second axle are rotatable in turn and then rotated synchronously to perform multi-position shifting with at least three rotational positions.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
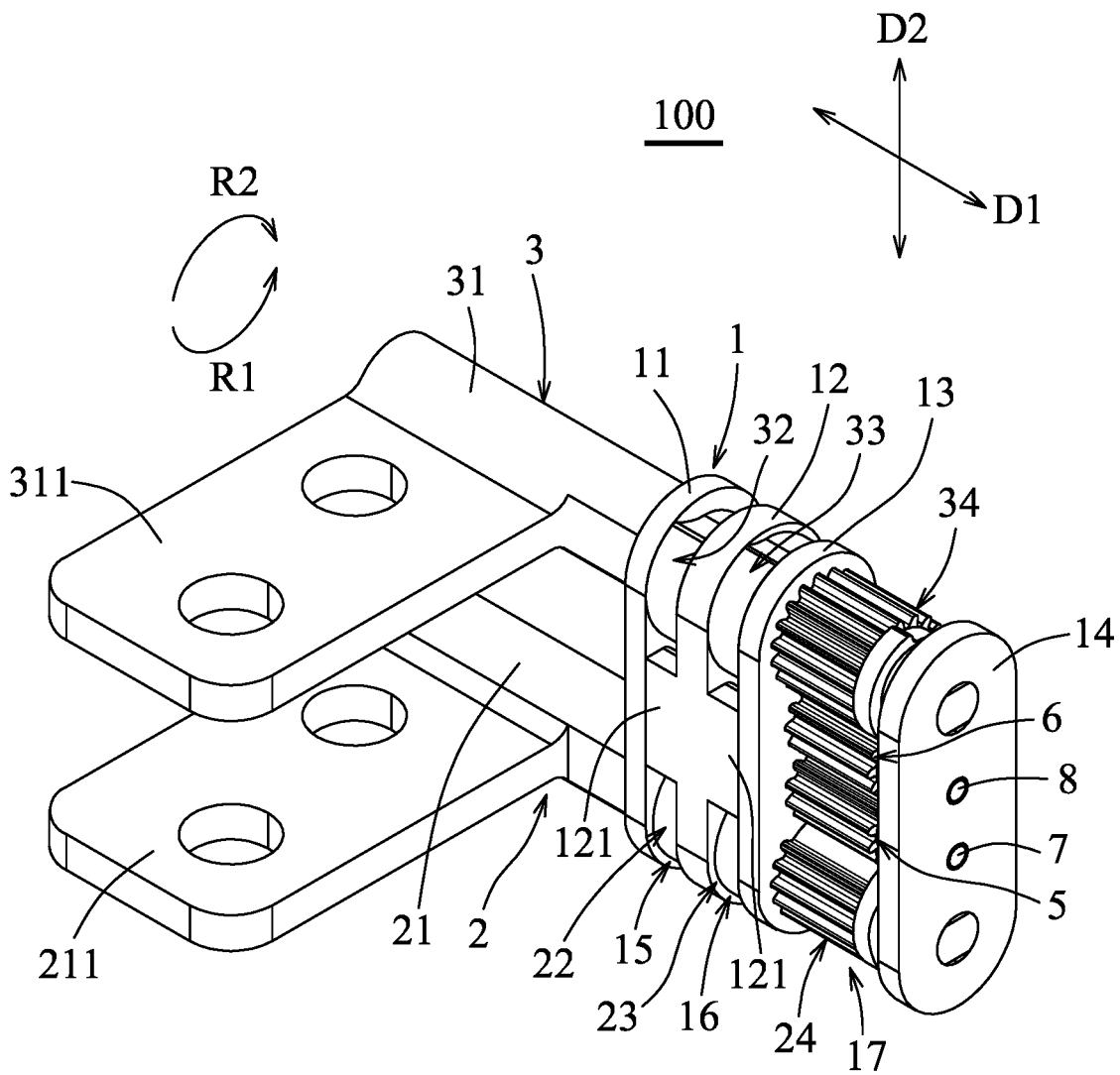
FIG. 1 is a perspective view illustrating an embodiment of a multi-position hinge according to the disclosure.
Figure 2:
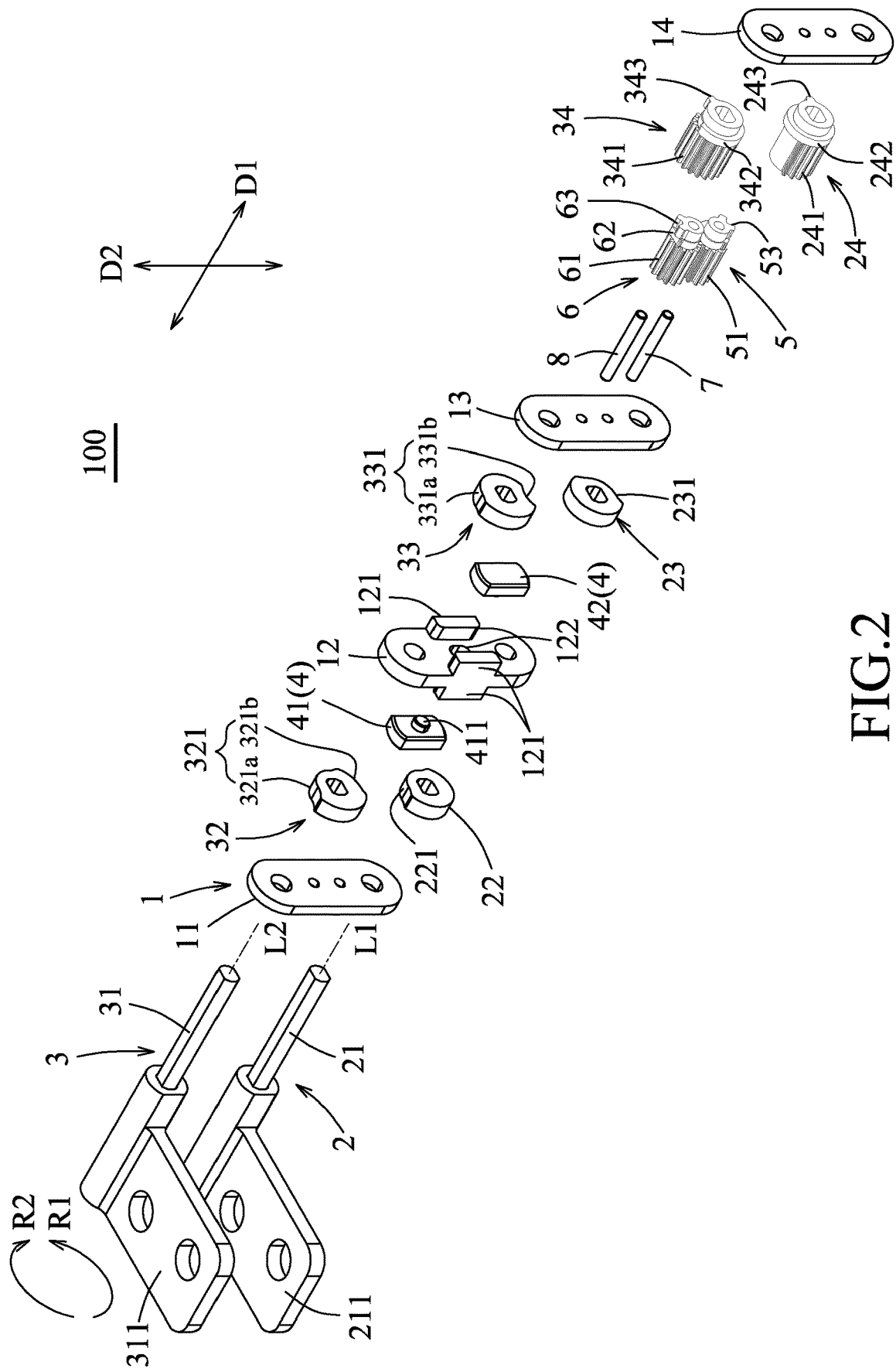
FIG. 2 is an exploded perspective view of FIG. 1.
Figure 3:
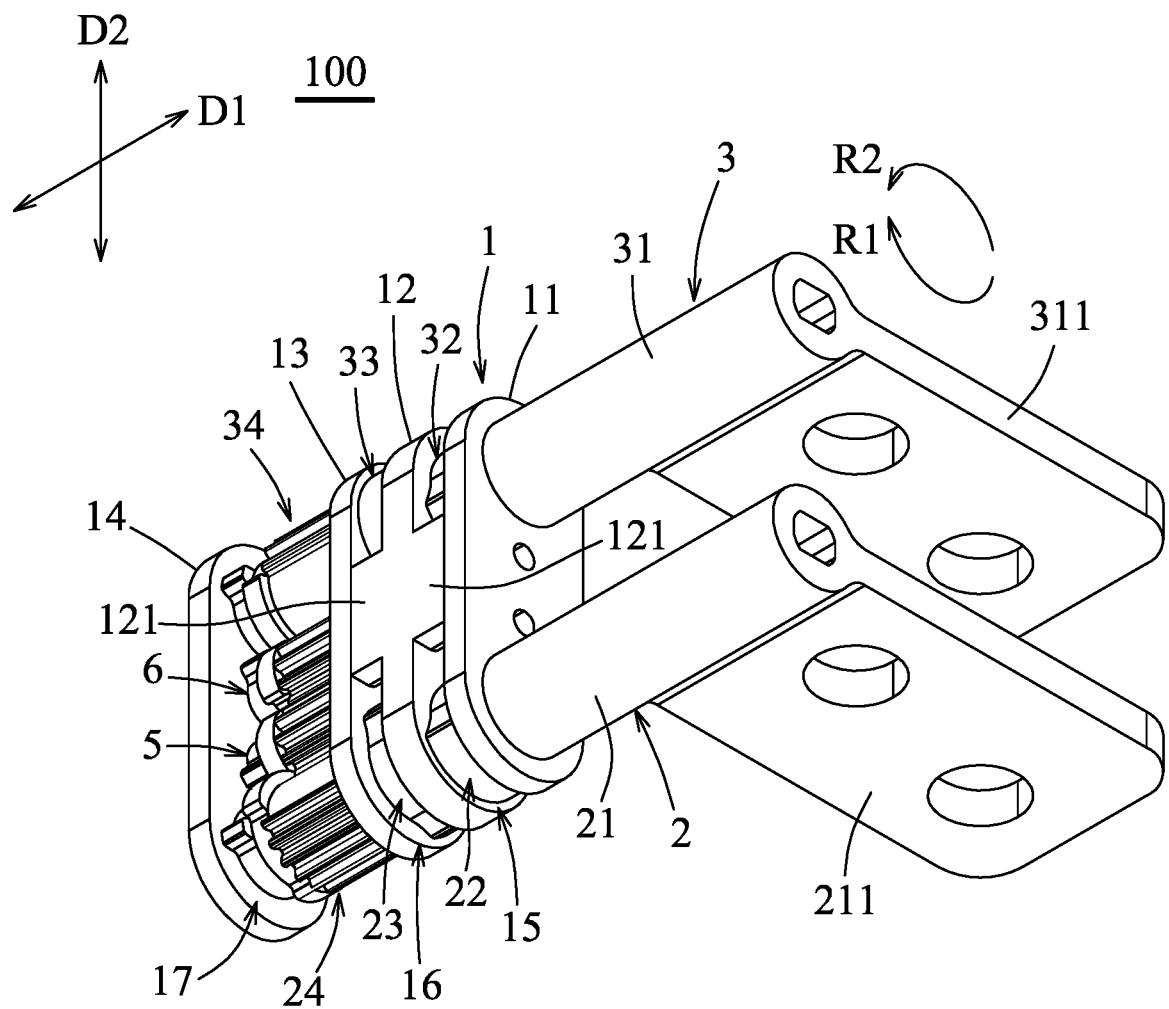
FIG. 3 is a perspective view of the embodiment taken from another angle.
Figure 4:
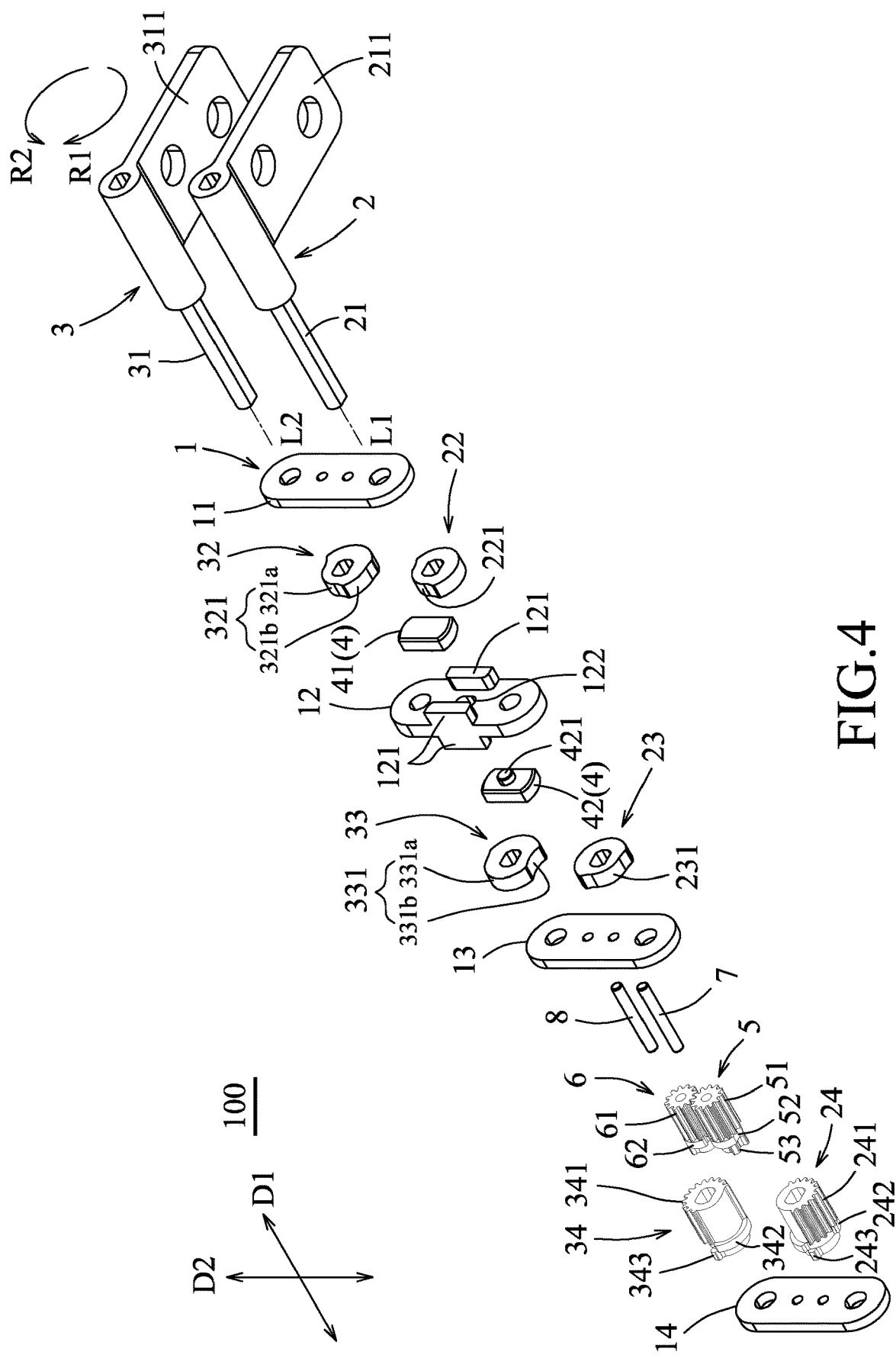
FIG. 4 is an exploded perspective view of FIG. 3.
Figure 5:
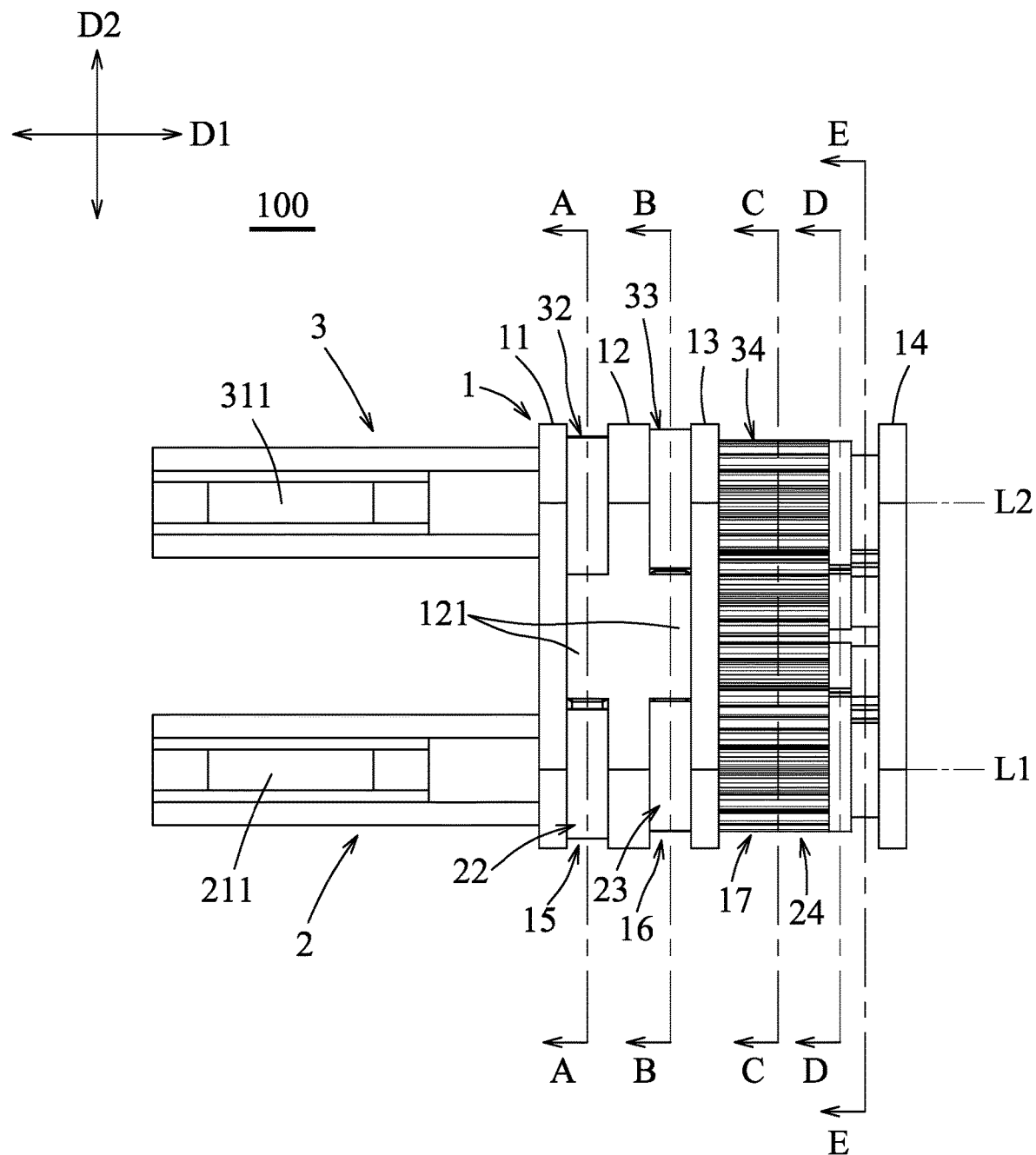
FIG. 5 is a schematic side view of the embodiment, illustrating the state when a first axle is in a first initial angular position, and a second axle is in a second initial angular position.
Figure 6:
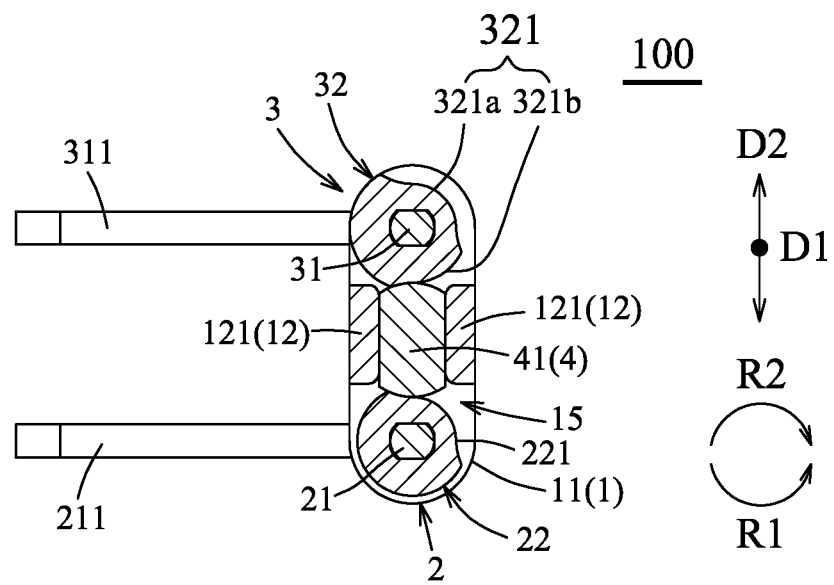
FIG. 6 is a sectional view taken along line A-A of FIG. 5.
Figure 7:
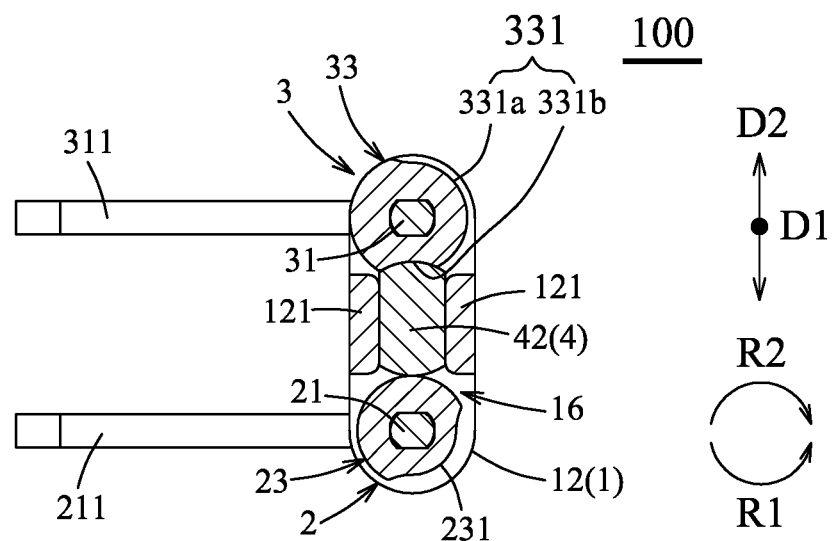
FIG. 7 is a sectional view taken along line B-B of FIG. 5.
Figure 8:
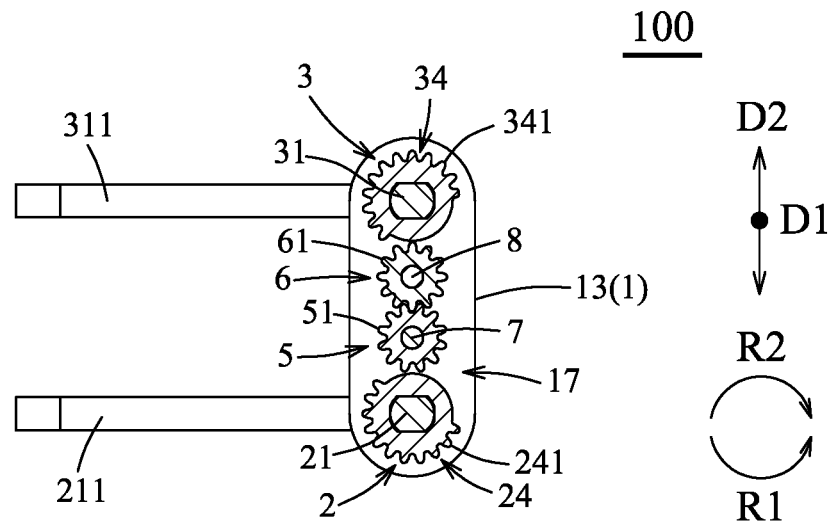
FIG. 8 is a sectional view taken along line C-C of FIG. 5.
Figure 9:
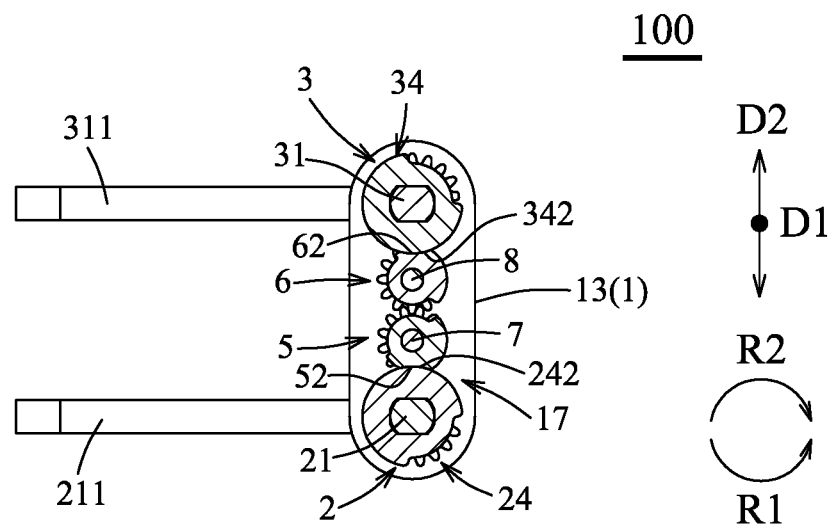
FIG. 9 is a sectional view taken along line D-D of FIG. 5.
Figure 10:
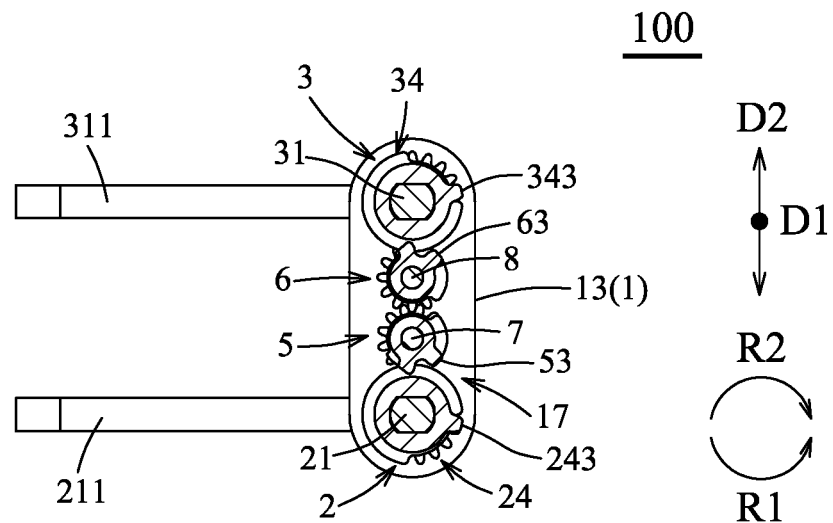
FIG. 10 is a sectional view taken along line E-E of FIG. 5.

Referring to FIGS. 1 to 5, an embodiment of a multi-position hinge 100 according to the disclosure is adapted to be mounted on two casing parts (not shown) of an electronic device (not shown). The electronic device may be a foldable mobile phone, a tablet, a tablet PC, a portable PC, etc. The multi-position hinge 100 of the embodiment includes a base seat 1, a first axle 2, a second axle 3, a sliding assembly 4, a first idler gear 5 and a second idler gear 6.

The base seat 1 has a first seat body 11, a second seat body 12, a third seat body 13 and a fourth seat body 14 which are spaced apart from one another in a first direction (D1) and each of which extends in a second direction (D2) that is transverse to the first direction (D1), and defines a first receiving space 15 between the first and second seat bodies 11, 12, a second receiving space 16 between the second and third seat bodies 12, 13, and a third receiving space 17 between the third and fourth seat bodies 13, 14.

The first axle 2 extends through the base seat 1 in the first direction (D1) and is rotatable relative to the base seat 1 about a first axis (L1) in the first direction (D1). The first axle 2 has a first shaft 21 which rotatably extends along the first axis (L1) through the base seat 1, a first disc 22 and a second disc 23 which are non-rotatably sleeved on the first shaft 21, and a first gear member 24 which is non-rotatably sleeved on the first shaft 21. The first shaft 21 has a first mounting portion 211 disposed on an end remote from the base seat 1. The first disc 22, the second disc 23 and the first gear member 24 are disposed in the first, second and third receiving spaces 15, 16, 17, respectively, and at one side thereof. The first disc 22 has a first recess 221 formed in a peripheral surface thereof and extending in a circumferential direction of the first axis (L1). The second disc 23 has a second recess 231 formed in a peripheral surface thereof and extending in the circumferential direction of the first axis (L1). The first gear member 24 has a first gear portion 241 which is formed on a part of a peripheral surface thereof and extends in the circumferential direction of the first axis (L1), a first protrusion 242 which protrudes radially and outwardly from the peripheral surface, and a first actuating gear portion 243 which has a module larger than that of the first gear portion 241. The first gear portion 241, the first protrusion 242 and the first actuating gear portion 243 are arranged along the first direction (D1). In various embodiments, the first recess 221, the second recess 231, the first gear portion 241, the first protrusion 242 and the first actuating gear portion 243 may be formed directly on the first shaft 21. Additionally, the arrangement of the first recess 221, the second recess 231, the first gear portion 241, the first protrusion 242 and the first actuating gear portion 243 in the first direction (D1) may be different from that in this embodiment. In this embodiment, the circumferential direction of the first axis (L1) is a direction transverse to the first direction (D1), and may include the second direction (D2).

The second axle 3 extends through the base seat 1 in the first direction (D1) and is rotatable relative to the base seat 1 about a second axis (L2) in the first direction (D1). The second axle 3 is spaced apart from the first axle 2 in the second direction (D2). The second axle 3 has a second shaft 31 which rotatably extends along the second axis (L2) through the base seat 1, a third disc 32 and a fourth disc 33 which are non-rotatably sleeved on the second shaft 31, and a second gear member 34 which is non-rotatably sleeved on the second shaft 31. The second shaft 31 has a second mounting portion 311 disposed on an end remote from the base seat 1. The third disc 32, the fourth disc 33 and the second gear member 34 are disposed in the first, second and third receiving spaces 15, 16, 17, respectively, and at the other side thereof. The third disc 32 has a third recess 321 which is formed in a peripheral surface thereof to extend in a circumferential direction of the second axis (L2) and which is aligned with the first recess 221 in the second direction (D2). The third recess 321 has a third deep recessed portion (321a) and a third shallow recessed portion (321b) which extends angularly from the third deep recessed portion (321a). The fourth disc 33 has a fourth recess 331 which is formed in a peripheral surface thereof to extend in the circumferential direction of the second axis (L2) and which is aligned with the second recess 231 in the second direction (D2).

The fourth recess 331 has a fourth shallow recessed portion (331a) and a fourth deep recessed portion (331b) which extends angularly from the fourth shallow recessed portion (331a). The second gear member 34 has a second gear portion 341 which is formed on a part of a peripheral surface thereof and extends in the circumferential direction of the second axis (L2), a second protrusion 342 which protrudes radially and outwardly from the peripheral surface, and a second actuating gear portion 343 which has a module larger than that of the second gear portion 341. The second gear portion 341, the second protrusion 342 and the second actuating gear portion 343 are arranged along the first direction (D1). In various embodiments, the third recess 321, the fourth recess 331, the second gear portion 341, the second protrusion 342 and the second actuating gear portion 343 may be formed directly on the second shaft 31. Additionally, the arrangement of the third recess 321, the fourth recess 331, the second gear portion 341, the second protrusion 342 and the second actuating gear portion 343 in the first direction (D1) may be different from that in this embodiment, and may be modified correspondingly with the arrangement of the first recess 221, the second recess 231, the first gear portion 241, the first protrusion 242 and the first actuating gear portion 243. In this embodiment, the circumferential direction of the second axis (L2) is a direction transverse to the first direction (D1), and may include the second direction (D2).

The sliding assembly 4 is interposed between the first axle 2 and the second axle 3 and is disposed on and slidable relative to the base seat 1 in the second direction (D2). The sliding assembly 4 includes a first sliding member 41 which is slidably disposed in the first receiving space 15 and which has two ends alignable and engageable with the first recess 221 and/or the third recess 321 in the second direction (D2), and a second sliding member 42 which is slidably disposed in the second receiving space 16 and which has two ends alignable and engageable with the second recess 231 and/or the fourth recess 331 in the second direction (D2). Specifically, in this embodiment, the first sliding member 41 is retained and not slidable when the two ends thereof are respectively engaged with the first recess 221 and the third shallow recessed portion (321b) of the third recess 321, or when only one end thereof is engaged with the third deep recessed portion (321a) of the third recess 321 (the other end is engaged with the peripheral surface of the first disc 22). The first sliding member 41 is slidable only when the first recess 221 and the third deep recessed portion (321a) face the two ends of the first sliding member 41. Similarly, the second sliding member 42 is retained and not slidable when the two ends thereof are respectively engaged with the second recess 231 and the fourth shallow recessed portion (331a) of the fourth recess 331, or when only one end thereof is engaged with the fourth deep recessed portion (331b) of the fourth recess 331 (the other end is engaged with the peripheral surface of the second disc 23). The second sliding member 42 is slidable only when the second recess 231 and the fourth deep recessed portion (331b) face the two ends of the second sliding member 42. The first and second sliding members 41, 42 abut against an inner wall of the corresponding recess when retained and not slidable so as to restrict the rotation of the first and second axles 2, 3 to generate multiple positions of the hinge 100.

In this embodiment, the base seat 1 has a plurality of guiding plates 121 projecting from the second seat body 12 respectively toward the first and third seat bodies 11, 13 and extending in the second direction (D2) so as to restrain the sliding movements of the first and second sliding members 41, 42 in the second direction (D2). A sliding slot 122 extends through the second seat body 12 in the first direction (D1) and is elongated in the second direction (D2). The first and second sliding members 41, 42 respectively have studs 411, 421 inserted into and slidable along the sliding slot 122 so as to guide the sliding movements of the first and second sliding members 41, 42 in the second direction (D2). Moreover, in this embodiment, each of the ends of the first and second sliding members 41, 42 has an arcuate surface. Each of the first recess 221, the second recess 231, the third recess 321 and the fourth recess 331 has an arcuate inner wall correspondingly mating with the arcuate surface of the first and second sliding members 41, 42.

The first idler gear 5 and the second idler gear 6 are rotatably disposed on the third seat body 13 and the fourth seat body 14 through a first rotating shaft 7 and a second rotating shaft 8, respectively, so as to be rotatably received in the third receiving space 17, and are interposed between the first gear member 24 and the second gear member 34. The first idler gear 5 has a first idler gear portion 51 which is formed on a peripheral surface thereof to be aligned and mesh with the first gear portion 241, a first cavity 52 which is concaved radially and inwardly to be aligned and engaged with the first protrusion 242, and a first actuating idler gear portion 53 which has a module larger than that of the first idler gear portion 51 to be aligned and mesh with the first actuating gear portion 243. The second idler gear 6 has a second idler gear portion 61 which is formed on a peripheral surface thereof to be aligned and mesh with the second gear portion 341, a second cavity 62 which is concaved radially and inwardly to be aligned and engaged with the second protrusion 342, and a second actuating idler gear portion 63 which has a module larger than that of the second idler gear portion 61 to be aligned and mesh with the second actuating gear portion 343. The first idler gear portion 51 is meshable with the second idler gear portion 61 to make gearing connection between the first gear portion 241 and the second gear portion 341 so as to make synchronous rotation of the first gear member 24 and the second gear member 34.

The first axle 2 is rotatable relative to the base seat 1 among a first initial angular position, a first transit angular position and a first terminate angular position, and the second axle 3 is rotatable relative to the base seat 1 among a second initial angular position, a second transit angular position and a second terminate angular position. In this embodiment, the first transit angular position is at a middle between the first initial angular position and the first terminate angular position, and the second transit angular position is at a middle between the second initial angular position and the second terminate angular position. The first axle 2 has a first initial angle at the first initial angular position, a first terminate angle at the first terminate angular position, and a difference of 180 degrees between the first initial angle and the first terminate angle, and the second axle 3 has a second initial angle at the second initial angular position, a second terminate angle at the second terminate angular position, and a difference of 180 degrees between the second initial angle and the second terminate angle. Hence, a difference of 90 degrees is between the first initial angle and a first transit angle at the first transit angular position, and between the first transit angle and the first terminate angle, and a difference of 90 degrees is between the second initial angle and a second transit angle at the second transit angular position, and between the second transit angle and the second terminate angle. With the rotation of the first axle 2 from the first initial angular position to the first terminate angular position along a first rotational direction (R1), and with the rotation of the second axle 3 from the second initial angular position to the second terminate angular position along a second rotational direction (R2) that is opposite to the first rotational direction (R1), the multi-position hinge 100 brings the two casing parts carried thereon into rotation by 180 degrees so as to generate an overall rotation of almost 360 degrees of the two casing parts such that the two casing parts are shiftable from a folded state to another folded state. Specifically, when a user operates the two casing parts, the first axle 2 and the second axle 3 are rotated relative to the base seat 1 so as to turn the casing parts between the different folded states. In various embodiments, the first transit angular position may not be at a middle of the first initial and terminate angular positions, and the second transit angular position may not be at a middle of the second initial and terminate angular positions. The difference between the first initial and terminate angles and between the second initial and terminate angles may not be 180 degrees.

With reference to FIGS. 6 to 10, when the first axle 2 is in the first initial angular position and the second axle 3 is in the second initial angular position, the two ends of the first sliding member 41 are retainingly engaged with the first recess 221 and the third shallow recessed portion (321b) of the third recess 321, respectively, so as not to be slidable. The second recess 231 is opposite to and remote from the second sliding member 42 and the fourth deep recessed portion (331b) of the fourth recess 331 faces the second sliding member 42 such that the second sliding member 42 is retainingly and partly engaged with the fourth deep recessed portion (331b) so as not to be slidable, and an inner wall of the fourth deep recessed portion (331b) of the second axle 3 is obstructed by the second sliding member 42 from rotation in the second rotational direction (R2) so as to prevent rotation of the second axle 3 in the second rotational direction (R2). Additionally, the first gear portion 241 is opposite to and remote from the first idler gear portion 51, and the second gear portion 341 is opposite to and remote from the second idler gear portion 61 such that the first gear portion 241 is free from gearing connection with the second gear portion 341. Moreover, in this state, the first protrusion 242 is engaged in the first cavity 52 to restrict rotation of the first idler gear 5 relative to the first axle 2, and the second protrusion 342 is engaged in the second cavity 62 to restrict rotation of the second idler gear 6 relative to the second axle 3. Also, the first actuating gear portion 243 does not mesh with the first actuating idler gear portion 53, and the second actuating gear portion 343 does not mesh with the second actuating idler gear portion 63.

Meanwhile, it is noted that, in this embodiment, an inner wall of the first recess 221 of the first axle 2 is obstructed by the first sliding member 41 from rotation in the second rotational direction (R2) so as to prevent rotation of the first axle 2 in the second rotational direction (R2). The inner wall of the fourth deep recessed portion (331b) of the second axle 3 is also obstructed by the second sliding member 42 from rotation in the first rotational direction (R1) so as to prevent rotation of the second axle 3 in the first rotational direction (R1). In various embodiments, any other stopping members may be provided to restrict the rotation of the first axle 2 in the second rotational direction (R2) and the rotation of the second axle 3 in the first rotational direction (R1).

Figure 11:
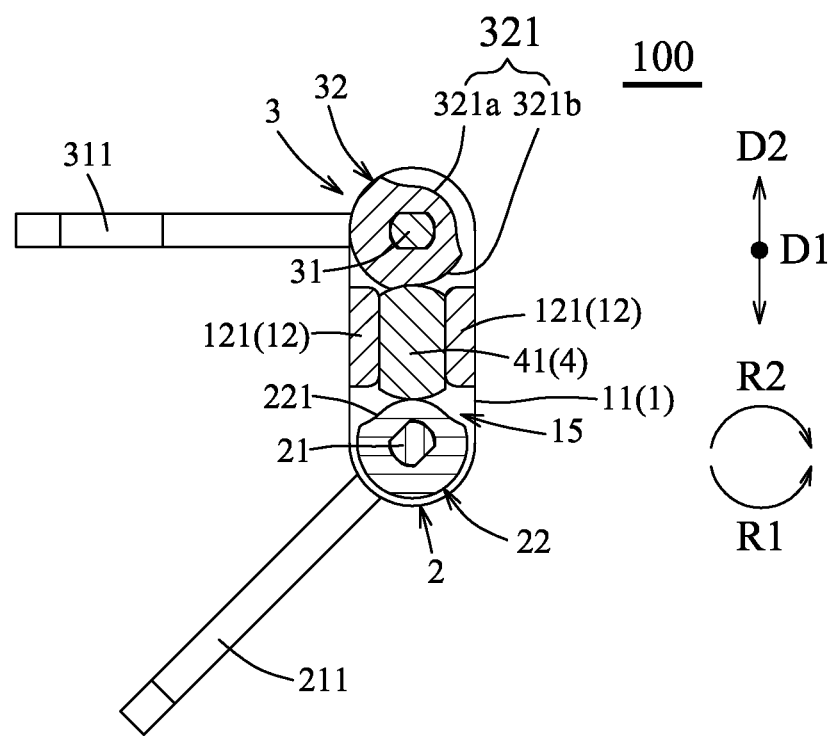
FIG. 11 is a sectional view similar to FIG. 6, illustrating the state when the first axle is in other angular positions between the first initial angular position and a first transit angular position and the second axle is in the second initial angular position.
Figure 12:
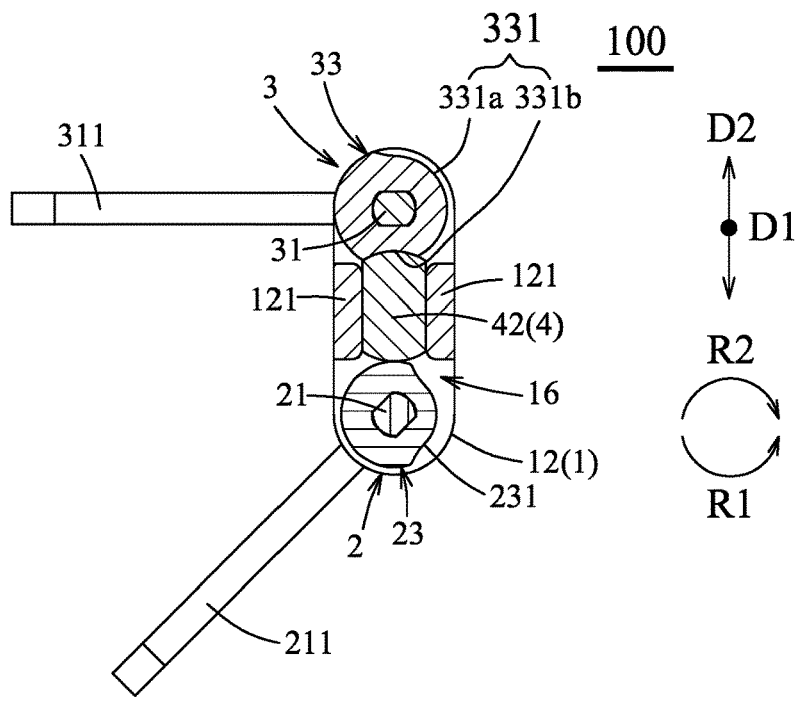
FIG. 12 is a sectional view similar to FIG. 7, illustrating the state when the first axle is in other angular positions between the first initial angular position and the first transit angular position and the second axle is in the second initial angular position.
Figure 13:
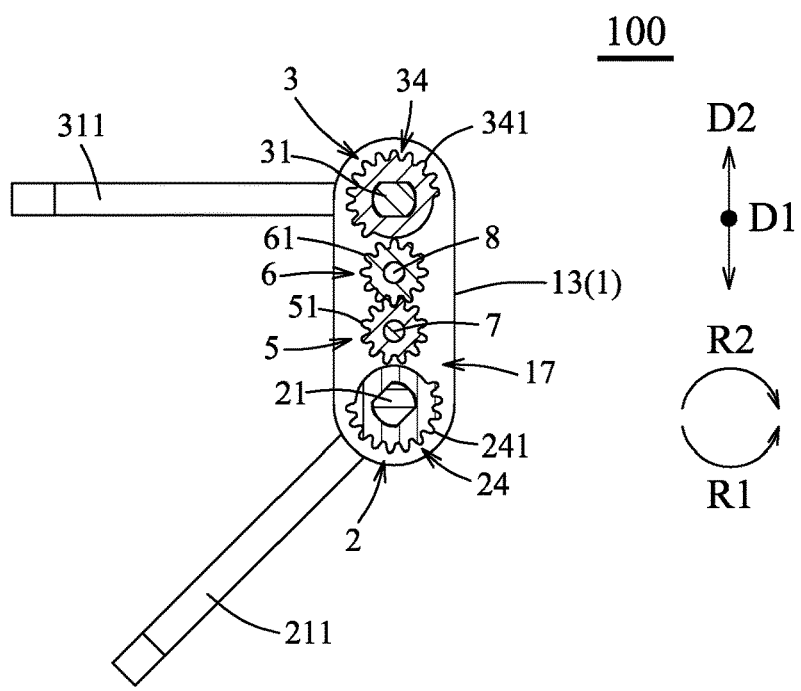
FIG. 13 is a sectional view similar to FIG. 8, illustrating the state when the first axle is in the other angular positions between the first initial angular position and the first transit angular position and the second axle is in the second initial angular position.
Figure 14:
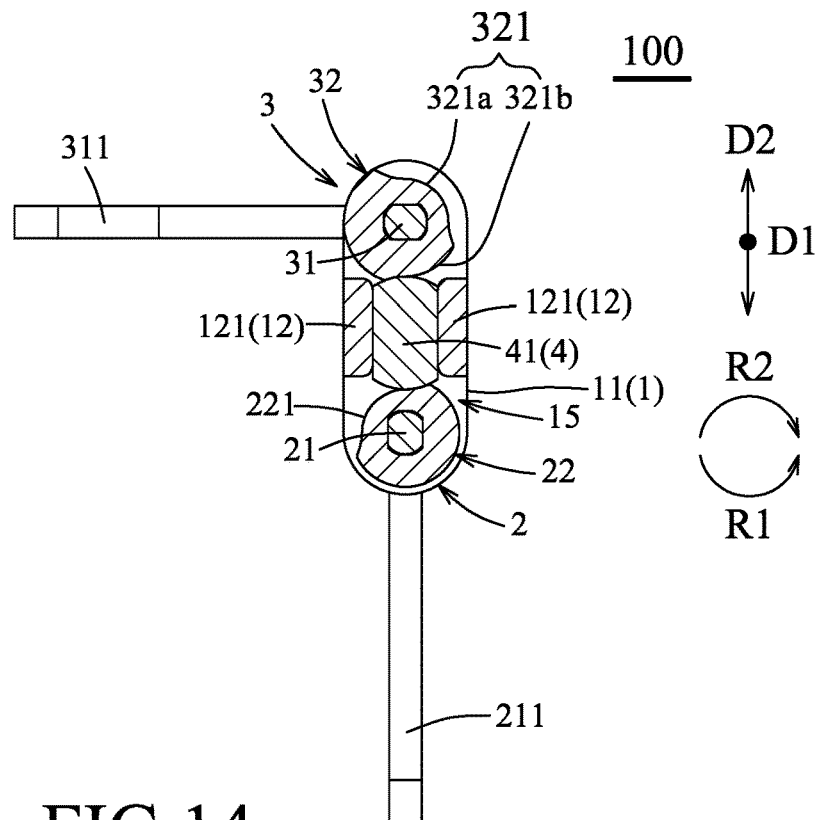
FIG. 14 is a sectional view similar to FIG. 6, illustrating the state when the first axle is the first transit angular position and the second axle is in the second initial angular position.
Figure 15:
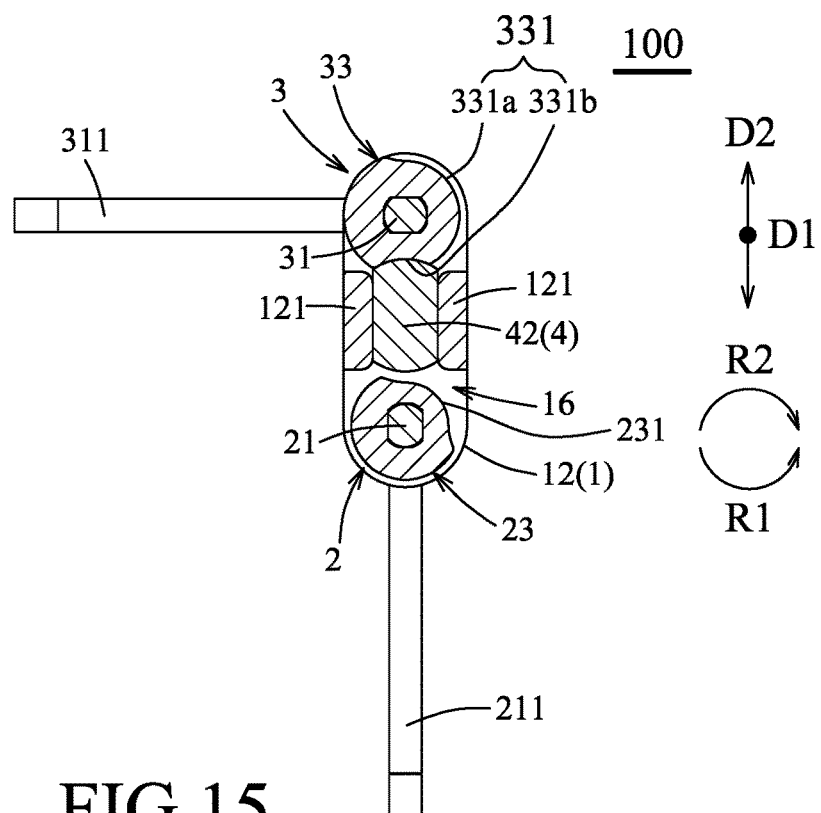
FIG. 15 is a sectional view similar to FIG. 7, illustrating the state when the first axle is in the first transit angular position and the second axle is in the second initial angular position.
Figure 16:
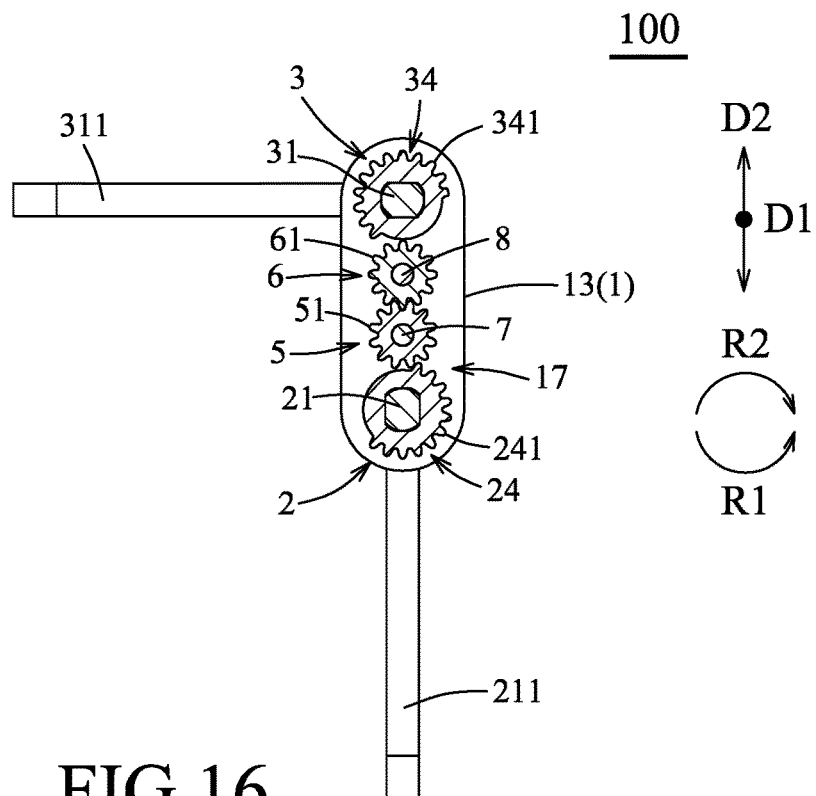
FIG. 16 is a sectional view similar to FIG. 8, illustrating the state when the first axle is in the first transit angular position and the second axle is in the second initial angular position.
Figure 17:
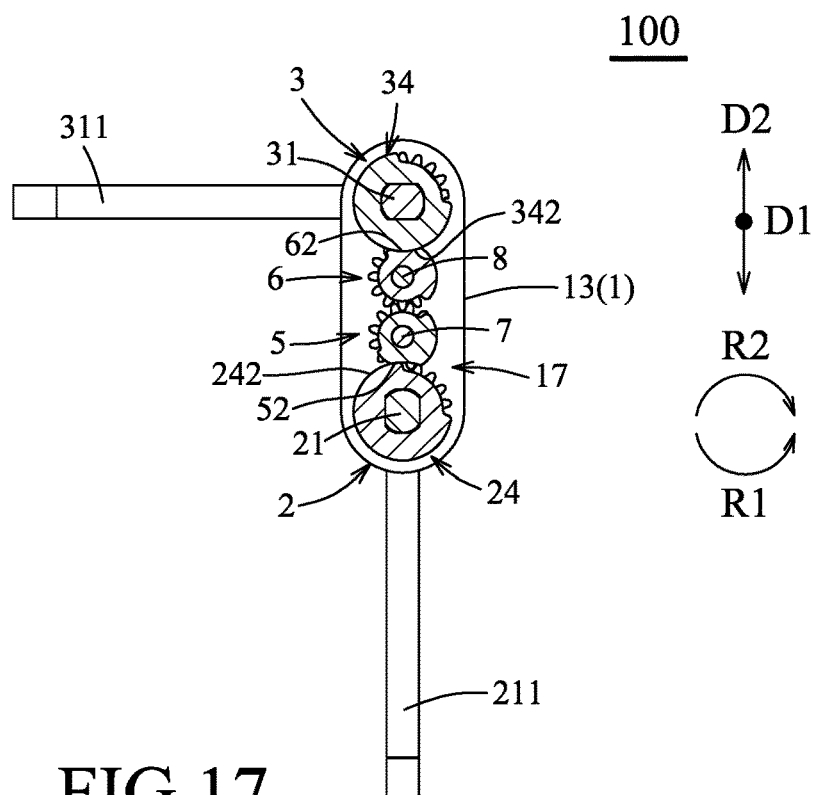
FIG. 17 is a sectional view similar to FIG. 9, illustrating the state when the first axle is in the first transit angular position and the second axle is in the second initial angular position.
Figure 18:
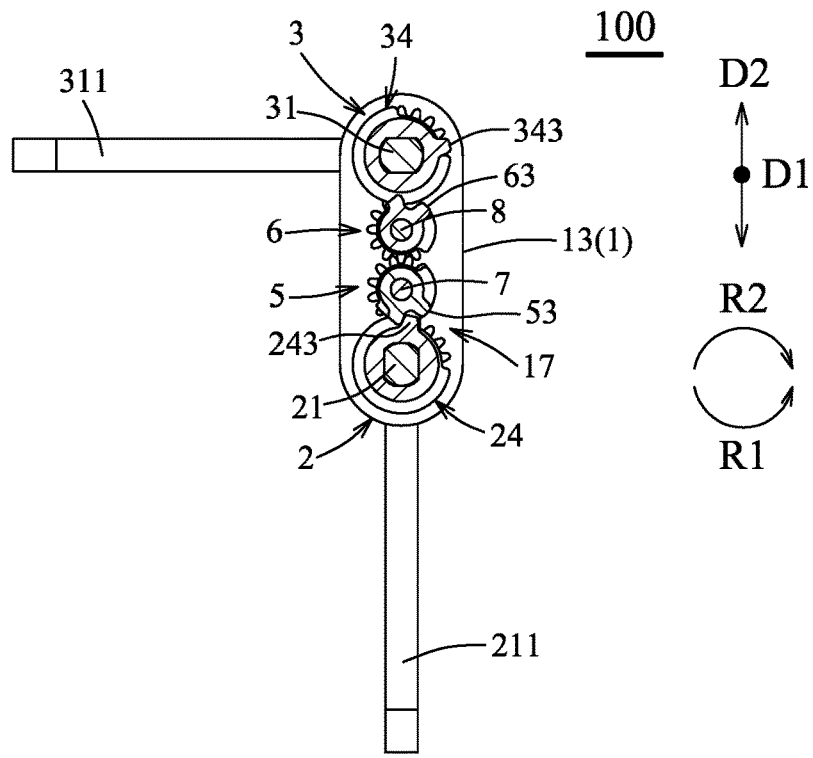
FIG. 18 is a sectional view similar to FIG. 10, illustrating the state when the first axle is in the first transit angular position and the second axle is in the second initial angular position.

With reference to FIGS. 11 to 13, when the first axle 2 is in other angular positions between the first initial angular position and the first transit angular position and the second axle 3 is in the second initial angular position, the two ends of the first sliding member 41 are retainingly engaged with the first recess 221 and the third shallow recessed portion (321b), respectively, so as not to be slidable. The second recess 231 is remote from the second sliding member 42 and the fourth deep recessed portion (331b) of the fourth recess 331 faces the second sliding member 42 such that the second sliding member 42 is retainingly and partly engaged with the fourth deep recessed portion (331b) so as not to be slidable, and the inner wall of the fourth deep recessed portion (331b) of the second axle 3 is obstructed by the second sliding member 42 from rotation in the second rotational direction (R2) so as to prevent rotation of the second axle 3 in the second rotational direction (R2). Additionally, the first gear portion 241 is opposite to and remote from the first idler gear portion 51, and the second gear portion 341 is opposite to and remote from the second idler gear portion 61 such that the first gear portion 241 is free from gearing connection with the second gear portion 341.

With reference to FIGS. 14 to 18, when the first axle 2 is in the first transit angular position and the second axle 3 is in the second initial angular position, the two ends of the first sliding member 41 are retainingly engaged with the first recess 221 and the third shallow recessed portion (321b) of the third recess 321, respectively, so as not to be slidable. The two ends of the second sliding member 42 face the second recess 231 and the fourth deep recess portion (331b) of the fourth recess 331, respectively, such that the second sliding member 42 is slidably engaged with either the second recess 231 or the fourth deep recessed portion (331b) so as to be slidable. It is noted that, at this stage, rotation of the second axle 3 in the second rotational direction (R2) will bring the second sliding member 42 in sliding movement toward the second recess 231. Additionally, an inner wall of the first recess 221 of the first axle 2 is obstructed by the first sliding member 41 from rotation in the first rotational direction (R1) so as to prevent rotation of the first axle 2 in the first rotational direction (R1). Moreover, the first gear portion 241 meshes with the first idler gear portion 51, but the second gear portion 341 is opposite to and remote from the second idler gear portion 61 such that the first gear portion 241 is free from gearing connection with the second gear portion 341. Furthermore, in this state, the first protrusion 242 is to be disengaged from the first cavity 52 to permit the rotation of the first idler gear 5, and the second protrusion 342 is engaged in the second cavity 62 to restrict rotation of the second idler gear 6 relative to the second axle 3. Also, the first actuating gear portion 243 meshes with the first actuating idler gear portion 53, and the second actuating gear portion 343 does not mesh with the second actuating idler gear portion 63.

Figure 19:
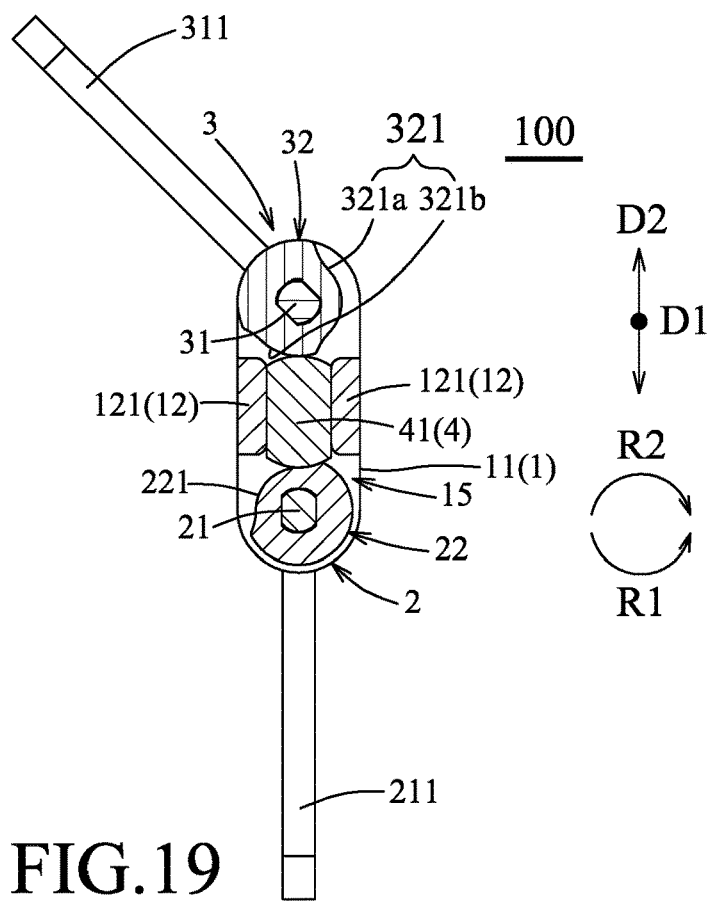
FIG. 19 is a sectional view similar to FIG. 6, illustrating the state when the first axle is in the first transit angular position and the second axle is in other angular positions between the second initial angular position and a second transit angular position.
Figure 20:
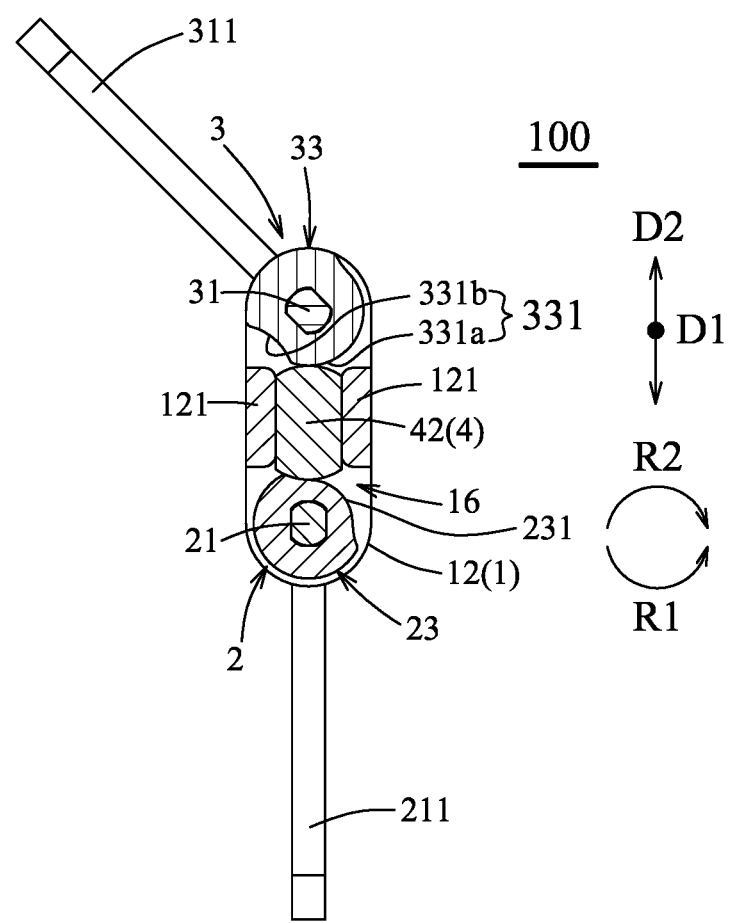
FIG. 20 is a sectional view similar to FIG. 7, illustrating the state when the first axle is in the first transit angular position and the second axle is in the other angular positions between the second initial angular position and the second transit angular position.
Figure 21:
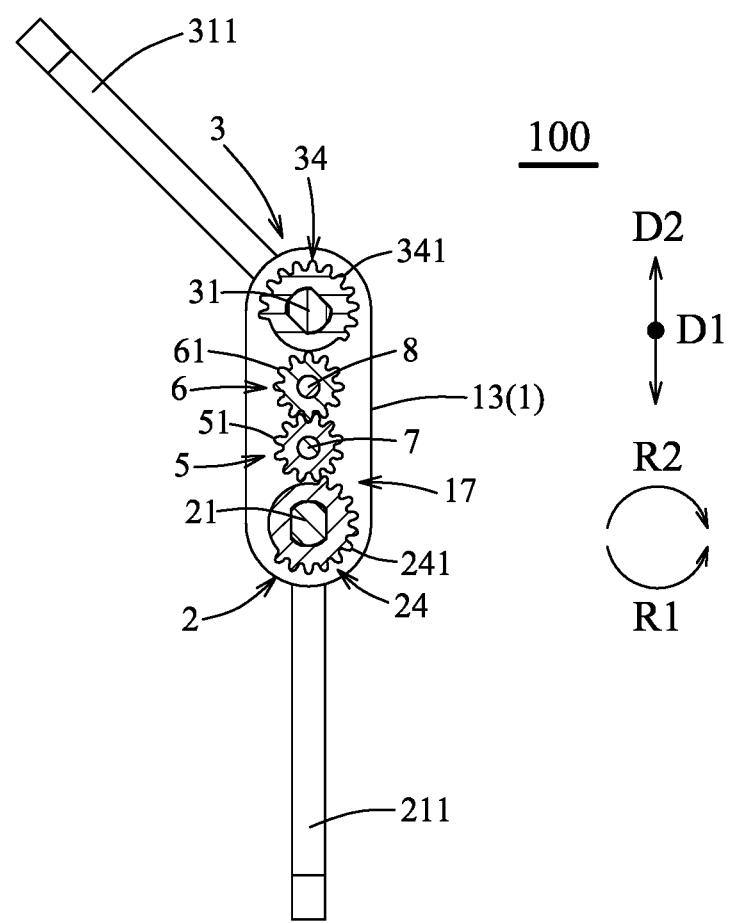
FIG. 21 is a sectional view similar to FIG. 8, illustrating the state when the first axle is in the first transit angular position and the second axle is in the other angular positions between the second initial angular position and the second transit angular position.
Figure 22:
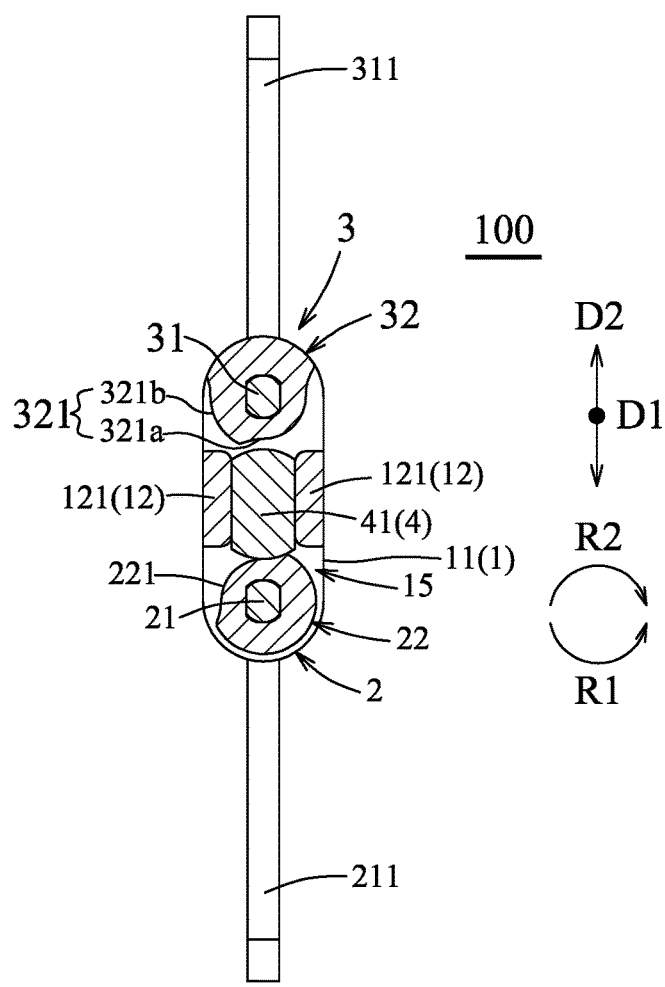
FIG. 22 is a sectional view similar to FIG. 6, illustrating the state when the first axle is in the first transit angular position and the second axle is in the second transit angular position.
Figure 23:
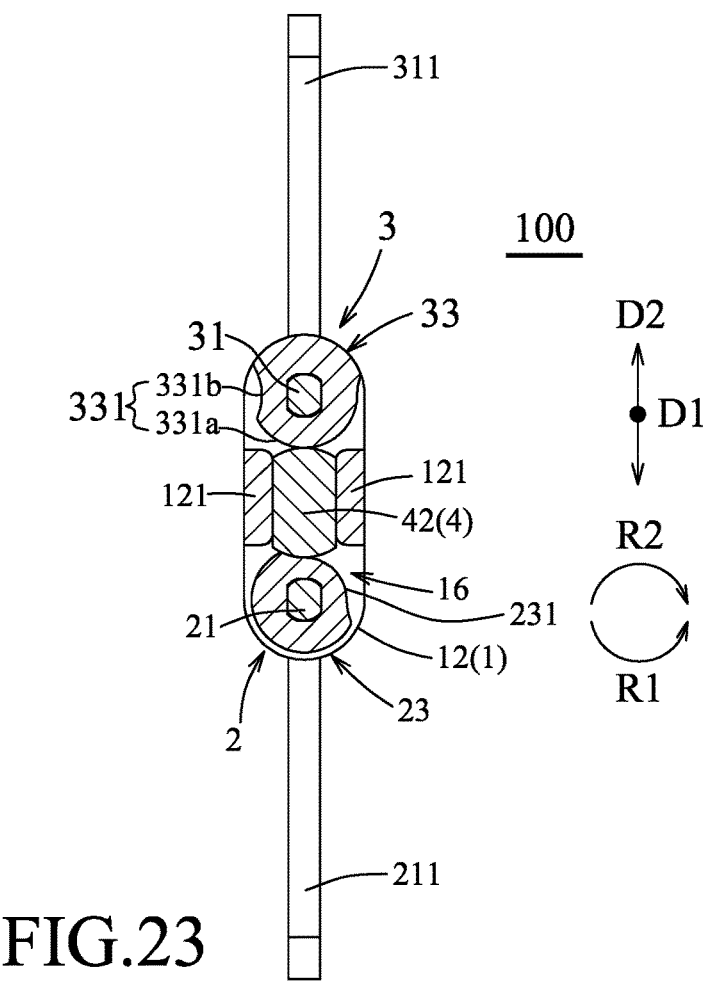
FIG. 23 is a sectional view similar to FIG. 7, illustrating the state when the first axle is in the first transit angular position and the second axle is in the second transit angular position.
Figure 24:
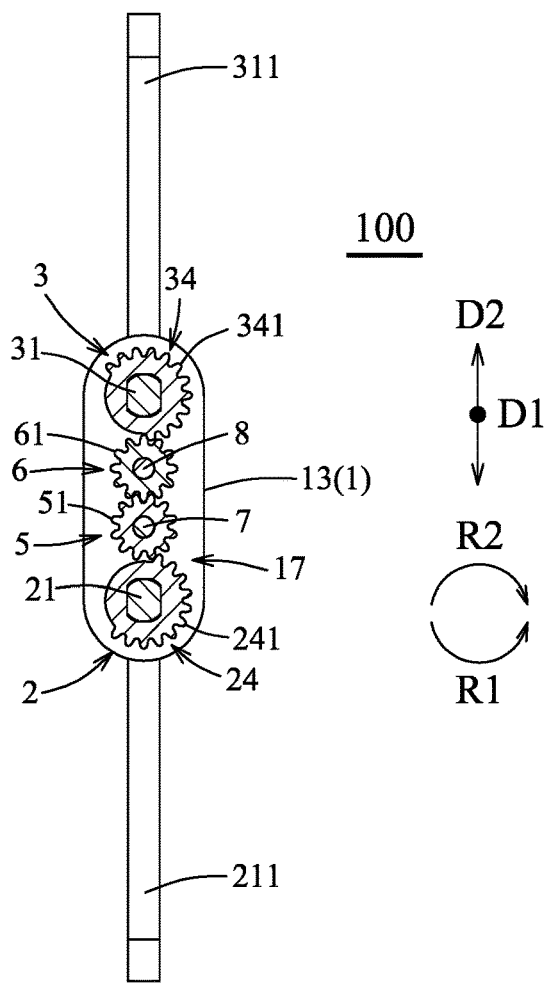
FIG. 24 is a sectional view similar to FIG. 8, illustrating the state when the first axle is in the first transit angular position and the second axle is in the second transit angular position.
Figure 25:
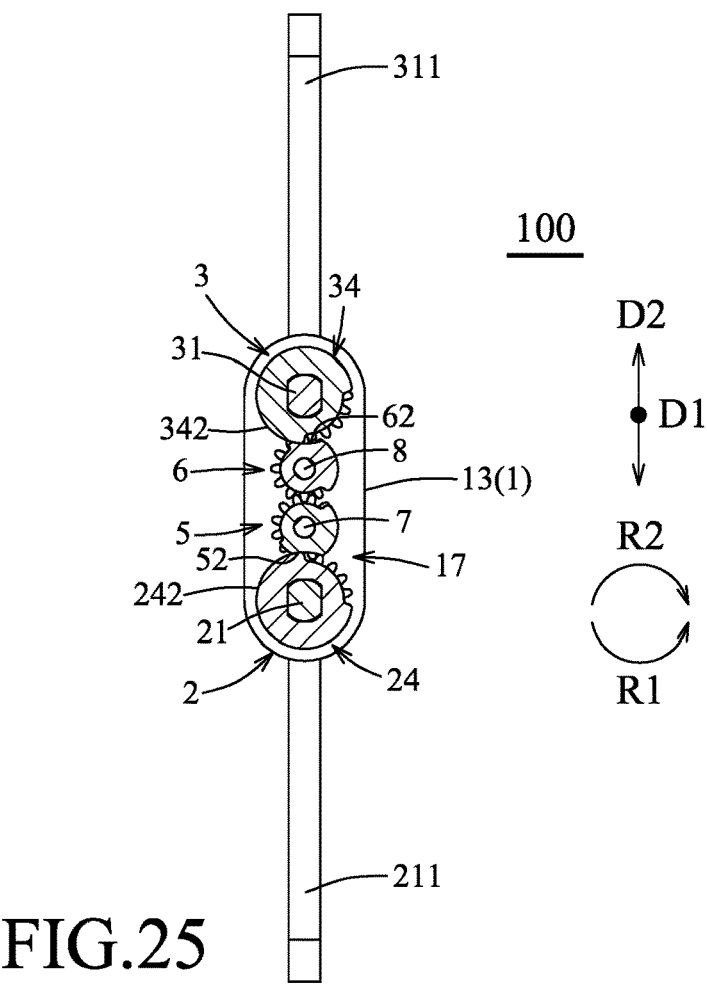
FIG. 25 is a sectional view similar to FIG. 9, illustrating the state when the first axle is in the first transit angular position and the second axle is in the second transit angular position.
Figure 26:
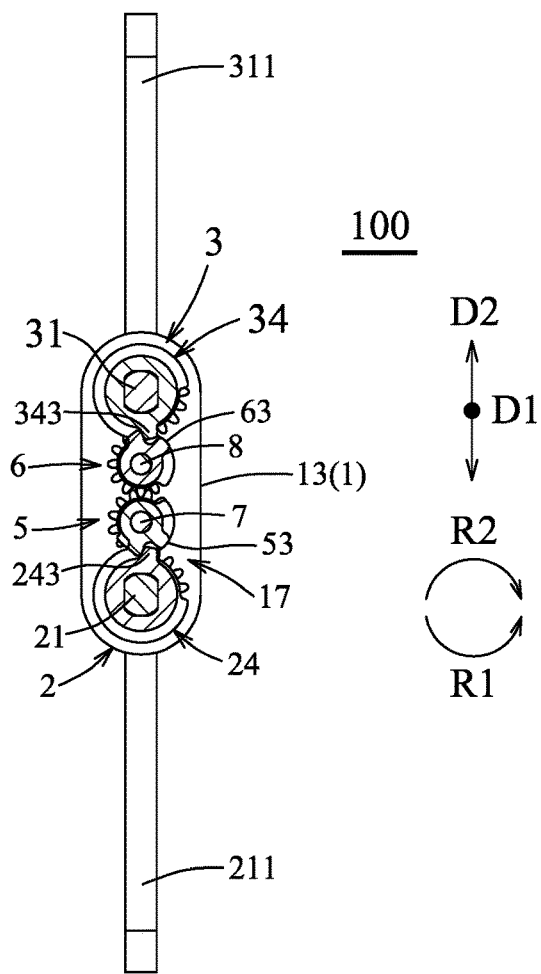
FIG. 26 is a sectional view similar to FIG. 10, illustrating the state when the first axle is in the first transit angular position and the second axle is in the second transit angular position.

With reference to FIGS. 19 to 21, when the first axle 2 is in the first transit angular position and the second axle 3 is in other angular positions between the second initial angular position and the second transit angular position, the two ends of the first sliding member 41 are retainingly engaged with the first recess 221 and the third shallow recessed portion (321b) of the third recess 321, respectively, so as not to be slidable, and the two ends of the second sliding member 42 are retainingly engaged with the second recess 231 and the fourth shallow recessed portion (331a) of the fourth recess 331 so as not to be slidable. Also, the inner wall of the first recess 221 of the first axle 2 is obstructed by the first sliding member 41 from rotation in the first rotational direction (R1) so as to prevent rotation of the first axle 2 in the first rotational direction (R1), and an inner wall of the second recess 231 of the first axle 2 is obstructed by the second sliding member 42 from rotation in the second rotational direction (R2) so as to prevent rotation of the first axle 2 in the second rotational direction (R2). Additionally, the first gear portion 241 meshes with the first idler gear portion 51, but the second gear portion 341 is opposite to and remote from the second idler gear portion 61 such that the first gear portion 241 is free from gearing connection with the second gear portion 341.

With reference to FIGS. 22 to 26, when the first axle 2 is in the first transit angular position and the second axle 3 is in the second transit angular position, the two ends of the first sliding member 41 respectively face the first recess 221 and the third deep recessed portion (321a) of the third recess 321 such that the first sliding member 41 is slidably engaged with either the first recess 221 or the third deep recessed portion (321a) so as to be slidable. In this embodiment, the first sliding member 41 is still engaged with the first recess 221. It is noted that, at this stage, rotation of the first axle 2 in the first rotational direction (R1) will bring the first sliding member 41 in sliding movement toward the third deep recessed portion (321a). The two ends of the second sliding member 42 are retainingly engaged with the second recess 231 and the fourth shallow recessed portion (331a) of the fourth recess 331 so as not to be slidable. Also, the inner wall of the second recess 231 of the first axle 2 is obstructed by the second sliding member 42 from rotation in the second rotational direction (R2) so as to prevent rotation of the first axle 2 in the second rotational direction (R2). Moreover, the first gear portion 241 meshes with the first idler gear portion 51, and the second actuating gear portion 343 meshes with the second actuating idler gear portion 63 such that the first gear portion 241 is made to be in gearing connection with the second gear portion 341 through the first idler gear portion 51 and the second idler gear portion 61. Furthermore, at this stage, the first protrusion 242 is to be disengaged from the first cavity 52 to permit the rotation of the first idler gear 5, and the second protrusion 342 is to be disengaged from the second cavity 62 to permit the rotation of the second idler gear 6. The first actuating gear portion 243 meshes with the first actuating idler gear portion 53, and the second actuating gear portion 343 meshes with the second actuating idler gear portion 63.

Figure 27:
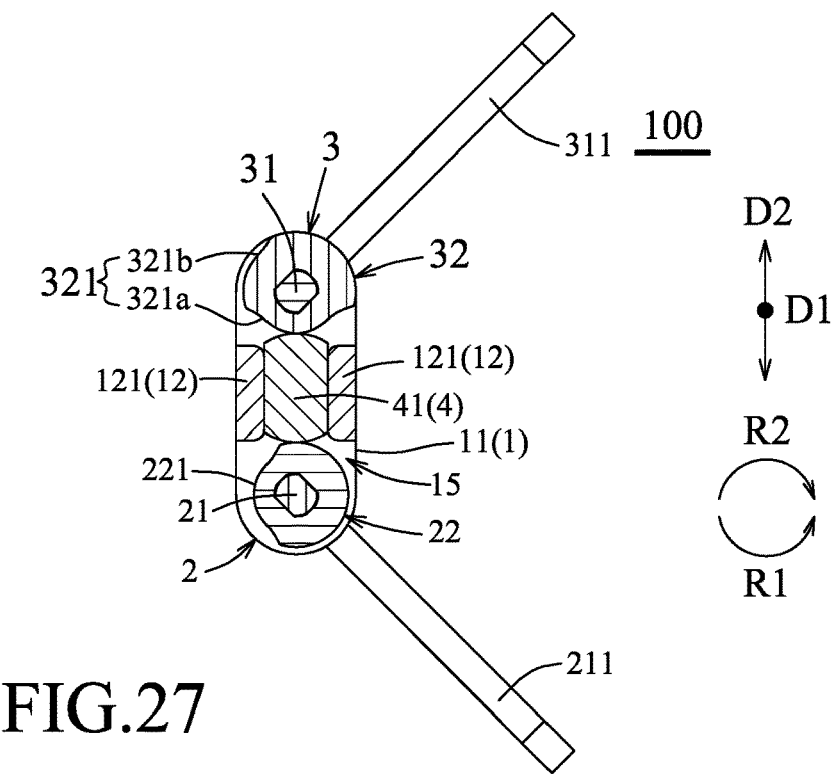
FIG. 27 is a sectional view similar to FIG. 6, illustrating the state when the first axle is in other angular positions between the first transit angular position and a first terminate angular position and the second axle is in other positions between the second transit angular position and a second terminate angular position.
Figure 28:
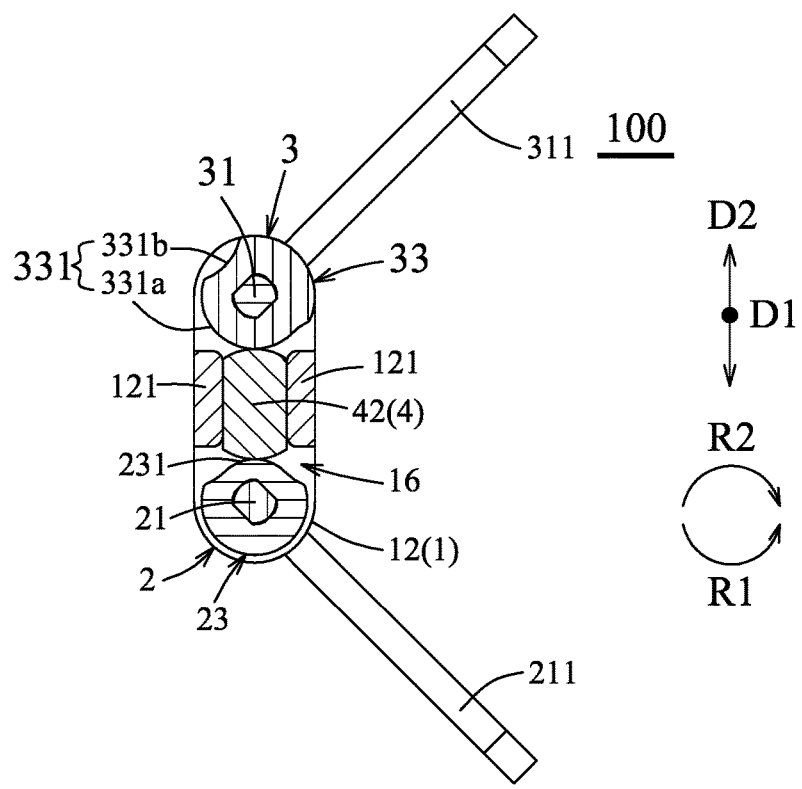
FIG. 28 is a sectional view similar to FIG. 7, illustrating the state when the first axle is in the other angular positions between the first transit angular position and the first terminate angular position and the second axle is in the other positions between the second transit angular position and the second terminate angular position.
Figure 29:
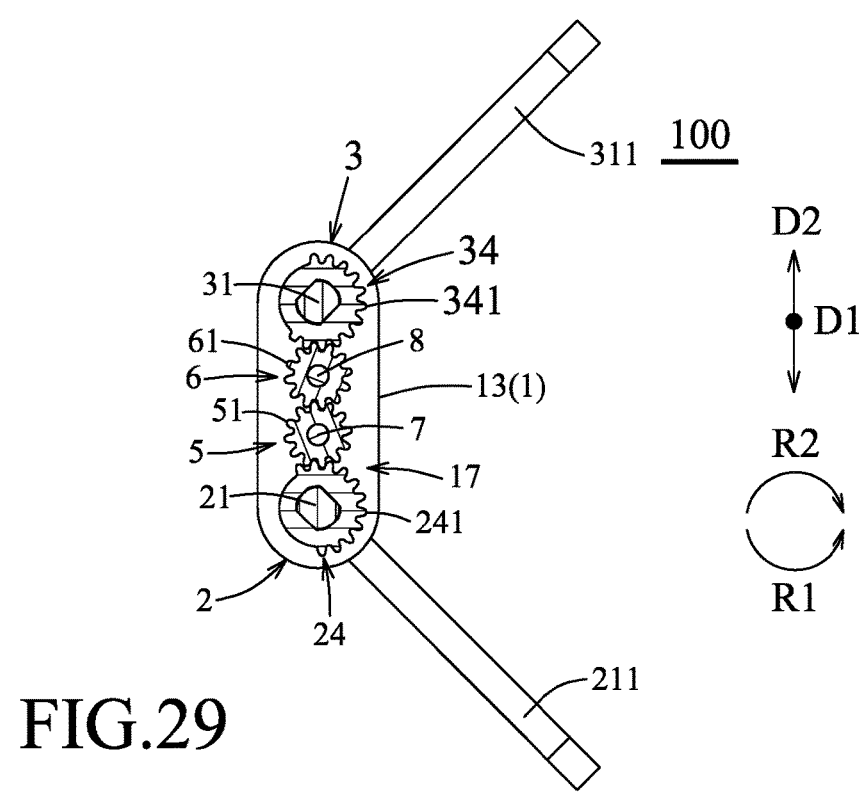
FIG. 29 is a sectional view similar to FIG. 8, illustrating the state when the first axle is in the other angular positions between the first transit angular position and the first terminate angular position and the second axle is in the other positions between the second transit angular position and the second terminate angular position.
Figure 30:
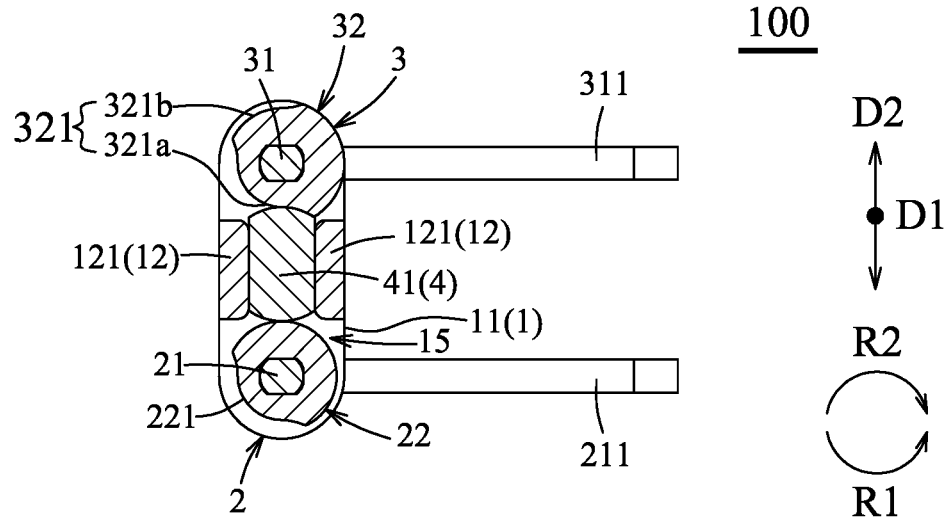
FIG. 30 is a sectional view similar to FIG. 6, illustrating the state when the first axle is in the first terminate angular position and the second axle is in the second terminate angular position.
Figure 31:
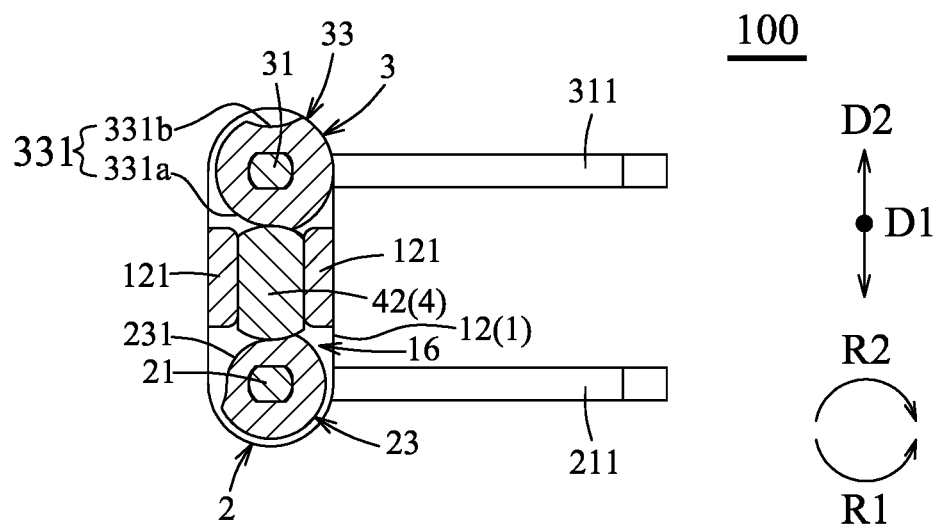
FIG. 31 is a sectional view similar to FIG. 7, illustrating the state when the first axle is in the first terminate angular position and the second axle is in the second terminate angular position.
Figure 32:
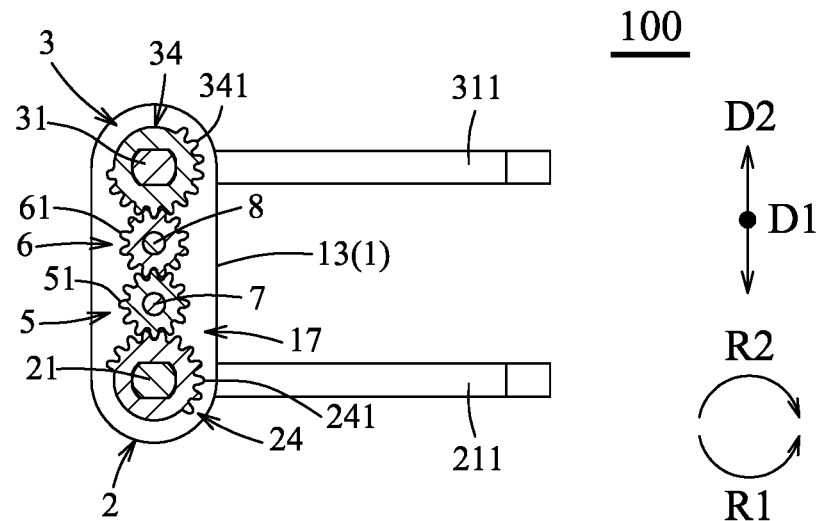
FIG. 32 is a sectional view similar to FIG. 8, illustrating the state when the first axle is in the first terminate angular position and the second axle is in the second terminate angular position.
Figure 33:
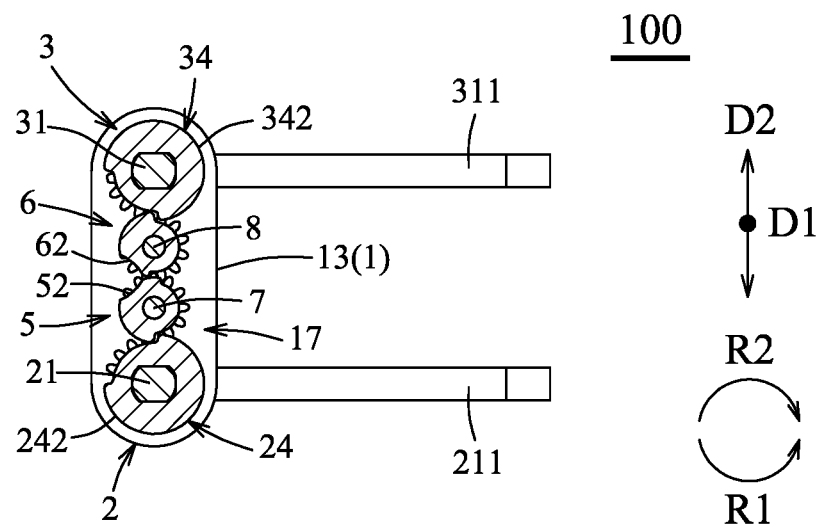
FIG. 33 is a sectional view similar to FIG. 9, illustrating the state when the first axle is in the first terminate angular position and the second axle is in the second terminate angular position.
Figure 34:
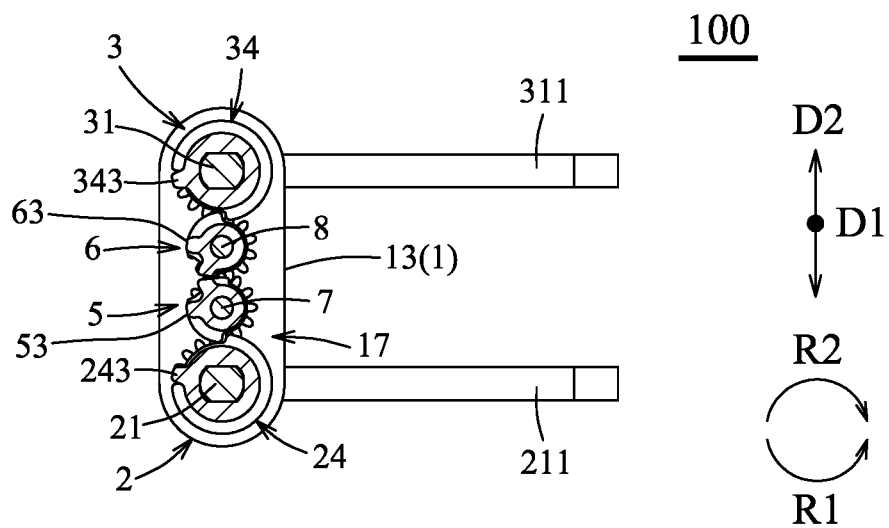
FIG. 34 is a sectional view similar to FIG. 10, illustrating the state when the first axle is in the first terminate angular position and the second axle is in the second terminate angular position.

With reference to FIGS. 27 to 29, when the first axle 2 is in other angular positions between the first transit angular position and the first terminate angular position and the second axle 3 is in other angular positions between the second transit angular position and the second terminate angular position, the first recess 221 is remote from the first sliding member 41 and the third deep recessed portion (321a) of the third recess 321 faces the first sliding member 41 such that the first sliding member 41 is retainingly engaged with the third deep recessed portion (321a) so as not to be slidable, and the two ends of the second sliding member 42 are retainingly engaged with the second recess 231 and the fourth shallow recessed portion (331a) of the fourth recess 331 so as not to be slidable. Additionally, the first gear portion 241 meshes with the first idler gear portion 51 and the second gear portion 341 meshes with the second idler gear portion 61 such that the first gear portion 241 is made to be in gearing connection with the second gear portion 341 through the first idler gear portion 51 and the second idler gear portion 61.

With reference to FIGS. 30 to 34, when the first axle 2 is in the first terminate angular position and the second axle 3 is in the second terminate angular position, the first sliding member is retainingly engaged with the third deep recessed portion (321a) so as not to be slidable, and the second sliding member is retainingly engaged with both the second recess and the fourth shallow recessed portion (331a) so as not to be slidable. Additionally, the first gear portion 241 meshes with the first idler gear portion 51 and the second gear portion 341 meshes with the second idler gear portion 61 such that the first gear portion 241 is made to be in gearing connection with the second gear portion 341 through the first idler gear portion 51 and the second idler gear portion 61. Moreover, in this state, the first protrusion 242 is disengaged from the first cavity 52 so as to permit the rotation of the first idler gear 5. The second protrusion 342 is disengaged from the second cavity 62 to permit the rotation of the second idler gear 6. The first actuating gear portion 243 does not mesh with the first actuating idler gear portion 53, and the second actuating gear portion 343 does not mesh with the second actuating idler gear portion 63.

Meanwhile, it is noted that, in this embodiment, the inner wall of the second recess 231 of the first axle 2 is obstructed by the second sliding member 42 from rotation in the first rotational direction (R1) so as to prevent rotation of the first axle 2 in the first rotational direction (R1), and the inner wall of the third deep recessed portion (321*a*) of the second axle 3 is obstructed by the first sliding member 41 from rotation in the second rotational direction (R2) so as to prevent rotation of the second axle 3 in the second rotational direction (R2). In various embodiments, any other stopping members may be provided to restrict the rotation of the first axle 2 in the first rotational direction (R1) and the rotation of the second axle 3 in the second rotational direction (R2).

Particularly, only when the first axle 2 is in the other angular positions between the first transit angular position and the first terminate angular position and the second axle 3 is in the other angular positions between the second transit angular position and the second transit angular position, the first and second idler gear portions 51, 61 respectively mesh with the first and second gear portions 241, 341 and mesh with each other so as to make gearing connection between the first and second gear portions 241, 341 and synchronous rotation of the first axle 2 and the second axle 3. During the rotation of the first axle 2 from the first initial angular position toward the first transit angular position but not to the first transit angular position yet, the first protrusion 242 is engaged in the first cavity 52 to restrict rotation of the first idler gear 5. During continuing rotation of the first axle 2 from the first transit angular position, the first protrusion 242 is gradually disengaged from the first cavity 52 to permit the rotation of the first idler gear 5 relative to the first axle 2. Similarly, during the rotation of the second axle 3 from the second initial angular position toward the second transit angular position but not to the second transit angular position yet, the second protrusion 342 is engaged in the second cavity 62 to restrict rotation of the second idler gear 6 relative to the second axle 3. During continuing rotation of the second axle 3 from the second transit angular position, the second protrusion 342 is gradually disengaged from the second cavity 62 to permit the rotation of the second idler gear 6. Thus, idle rotation of the first idler gear 5 and the second idler gear 6 are prevented when the first gear portion 241 and the second gear portion 341 are free from gearing connection. Additionally, when the first axle 2 is in the first transit angular position, the first actuating gear portion 243 meshes with the first actuating idler gear portion 53. When the second axle 3 is in the second transit angular position, the second actuating gear portion 343 meshes with the second actuating idler gear portion 63. Therefore, once the first and second axles 2, 3 are rotated to make the gearing connection between the first gear portion 241 and the second gear portion 341 through the first and second idler gears 5, 6, the gearing connection between the first axle 2 and the first idler gear 5 and that between the second axle 3 and the second idler gear 6 can be reliably strengthened.

In various embodiments, the first and second idler gears 5, 6 may be dispensed therewith. The first protrusion 242 of the first gear member 24 and the second protrusion 341 of the second gear member 34 may thus be dispensed therewith. In this case, the first gear portion 241 of the first gear member 24 and the second gear portion 341 of the second gear member 34 directly mesh with each other to make gearing connection, and the first actuating gear portion 243 of the first gear member 24 and the second actuating gear portion 343 of the second gear member 34 directly mesh with each other to make gearing connection.

As illustrated, with the first axle 2 and the second axle 3 operatively connected with the first sliding member 41 and the second sliding member 42, and with the operative connection between the first gear portion 241 of the first axle 2 and the second gear portion 341 of the second axle 3, during the rotating shift of the hinge 100, the first axle 2 and the second axle 3 are rotatable in turn and then rotated synchronously to perform multi-position shifting with at least three rotational positions.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A multi-position hinge comprising:
a base seat;
a first axle extending through said base seat in a first direction and rotatable relative to said base seat about a first axis in the first direction, said first axle having a first gear portion which is formed in a circumferential direction of the first axis;
a second axle extending through said base seat in the first direction and rotatable relative to said base seat about a second axis in the first direction, said second axle being spaced apart from said first axle in a second direction which is transverse to the first direction, and having a second gear portion which is formed in a circumferential direction of the second axis; and
a sliding assembly interposed between said first axle and said second axle and disposed on and slidable relative to said base seat in the second direction, said sliding assembly including a first sliding member and a second sliding member;
wherein said first axle is rotatable relative to said base seat among a first initial angular position, a first transit angular position and a first terminate angular position, and said second axle is rotatable relative to said base seat among a second initial angular position, a second transit angular position and a second terminate angular position, and
wherein, during the rotation of said first axle from the first initial angular position to the first terminate angular position along a first rotational direction, and during the rotation of said second axle from the second initial angular position to the second terminate angular position along a second rotational direction that is opposite to the first rotational direction,
when said first axle is in the first initial angular position and said second axle is in the second initial angular position, said second axle is obstructed by said second sliding member from rotation in the second rotational direction, and said first gear portion is free from gearing connection with said second gear portion,
when said first axle is in other angular positions between the first initial angular position and the first transit angular position and said second axle is in the second initial angular position, said second axle is obstructed by said second sliding member from rotation in the second rotational direction, and said first gear portion is free from gearing connection with said second gear portion, when said first axle is in the first transit angular position and said second axle is in the second initial angular position, said first axle is obstructed by said first sliding member from rotation in the first rotational direction, and said first gear portion is free from gearing connection with said second gear portion, when said first axle is in the first transit angular position and said second axle is in other angular positions between the second initial angular position and the second transit angular position, said first axle is obstructed by said first sliding member from rotation in the first rotational direction, and is obstructed by said second sliding member from rotation in the second rotational direction, and said first gear portion is free from gearing connection with said second gear portion, when said first axle is in the first transit angular position and said second axle is in the second transit angular position, said first axle is obstructed by said second sliding member from rotation in the second rotational direction, and said first gear portion is made to be in gearing connection with said second gear portion, when said first axle is in other angular positions between the first transit angular position and the first terminate angular position and said second axle is in other angular positions between the second transit angular position and the second terminate angular position, said first gear portion is made to be in gearing connection with said second gear portion, and when said first axle is in the first terminate angular position and said second axle is in the second terminate angular position, said first gear portion is made to be in gearing connection with said second gear portion.

2. The multi-position hinge as claimed in claim 1, wherein said first axle has a first recess and a second recess which are formed in the circumferential direction of the first axis, said second axle having a third recess which is formed in the circumferential direction of the second axis and which is aligned with said first recess in the second direction, and a fourth recess which is formed in the circumferential direction of the second axis and which is aligned with said second recess in the second direction, said third recess having a third deep recessed portion and a third shallow recessed portion which extends angularly from said third deep recessed portion, said fourth recess having a fourth shallow recessed portion and a fourth deep recessed portion which extends angularly from said fourth shallow recessed portion, said first sliding member being alignable and partly engageable with said first recess and said third recess in the second direction, said second sliding member being alignable and partly engageable with said second recess and said fourth recess, wherein, during the rotation of said first axle from the first initial angular position to the first terminate angular position along the first rotational direction, and during the rotation of said second axle from the second initial angular position to the second terminate angular position along the second rotational direction, when said first axle is in the first initial angular position and said second axle is in the second initial angular position, said first sliding member is retainingly engaged with both said first recess and said third shallow recessed portion so as not to be slidable, said second sliding member is retainingly engaged with said fourth deep recessed portion so as not to be slidable, and an inner wall of said fourth deep recessed portion is obstructed by said second sliding member from rotation in the second rotational direction, when said first axle is in the other angular positions between the first initial angular position and the first transit angular position and said second axle is in the second initial angular position, said first sliding member is retainingly engaged with both said first recess and said third shallow recessed portion so as not to be slidable, said second sliding member is retainingly engaged with said fourth deep recessed portion so as not to be slidable, and said inner wall of said fourth deep recessed portion is obstructed by said second sliding member from rotation in the second rotational direction, when said first axle is in the first transit angular position and said second axle is in the second initial angular position, said first sliding member is retainingly engaged with both said first recess and said third shallow recessed portion so as not to be slidable, said second sliding member is slidably engaged with either said second recess or said fourth deep recessed portion to be slidable, and an inner wall of said first recess is obstructed by said first sliding member from rotation in the first rotational direction, when said first axle is in the first transit angular position and said second axle is in the other angular positions between the second initial angular position and the second transit angular position, said first sliding member is retainingly engaged with both said first recess and said third shallow recessed portion so as not to be slidable, said second sliding member is retainingly engaged with both said second recess and said fourth shallow recessed portion so as not to be slidable, said inner wall of said first recess is obstructed by said first sliding member from rotation in the first rotational direction, and an inner wall of said second recess is obstructed by said second sliding member from rotation in the second rotational direction, when said first axle is in the first transit angular position and said second axle is in the second transit angular position, said first sliding member is slidably engaged with either said first recess or said third deep recessed portion to be slidable, said second sliding member is retainingly engaged with both said second recess and said fourth shallow recessed portion so as not to be slidable, and said inner wall of said second recess is obstructed by said second sliding member from rotation in the second rotational direction, when said first axle is in the other angular positions between the first transit angular position and the first terminate angular position and said second axle is in the other angular positions between the second transit angular position and the second terminate angular position, said first sliding member is retainingly engaged with said third deep recessed portion so as not to be slidable, and said second sliding member is retainingly engaged with both said second recess and said fourth shallow recessed portion so as not to be slidable, and when said first axle is in the first terminate angular position and said second axle is in the second terminate angular position, said first sliding member is retainingly engaged with said third deep recessed portion so as not to be slidable, and said second sliding member is retainingly engaged with both said second recess and said fourth shallow recessed portion so as not to be slidable.

3. The multi-position hinge as claimed in claim 1, wherein the first transit angular position is at a middle between the first initial angular position and the first terminate angular position, and the second transit angular position is at a middle between the second initial angular position and the second terminate angular position.

4. The multi-position hinge as claimed in claim 1, wherein said first axle has a first initial angle at the first initial angular position, a first terminate angle at the first terminate angular position, and a difference of 180 degrees between the first initial angle and the first terminate angle, and said second axle has a second initial angle at the second initial angular position, a second terminate angle at the second terminate angular position, and a difference of 180 degrees between the second initial angle and the second terminate angle.

5. The multi-position hinge as claimed in claim 2, wherein, when said first axle is in the first initial angular position and said second axle is in the second initial angular position, said inner wall of said first recess is obstructed by said first sliding member from rotation in the second rotational direction, and said inner wall of said fourth deep recessed portion is obstructed by said second sliding member from rotation in the first rotational direction.

6. The multi-position hinge as claimed in claim 2, wherein, when said first axle is in the first terminate angular position and said second axle is in the second terminate angular position, said inner wall of said second recess is obstructed by said second sliding member from rotation in the first rotational direction, and an inner wall of said third deep recessed portion is obstructed by said first sliding member from rotation in the second rotational direction.

7. The multi-position hinge as claimed in claim 2, wherein said first axle has a first shaft which rotatably extends along the first axis through said base seat, and a first disc and a second disc which are non-rotatably sleeved on said first shaft, said first recess being formed in a peripheral surface of said first disc, said second recess being formed in a peripheral surface of said second disc, said second axle having a second shaft which rotatably extends along the second axis through said base seat, and a third disc and a fourth disc which are non-rotatably sleeved on said second shaft, said third recess being formed in a peripheral surface of said third disc, said fourth recess being formed in a peripheral surface of said fourth disc.

8. The multi-position hinge as claimed in claim 1, wherein said first axle has a first shaft which rotatably extends along the first axis through said base seat, and a first gear member which is non-rotatably sleeved on said first shaft, said first gear portion being formed on a part of a peripheral surface of said first gear member, said second axle having a second shaft which rotatably extends along the second axis through said base seat, and a second gear member which is non-rotatably sleeved on said second shaft, said second gear portion being formed on a part of a peripheral surface of said second gear member.

9. The multi-position hinge as claimed in claim 8, further comprising a first idler gear and a second idler gear which are rotatably disposed to said base seat and which are interposed between said first gear member and said second gear member, said first idler gear having a first idler gear portion which is formed on a peripheral surface thereof, said second idler gear having a second idler gear portion which is formed on a peripheral surface thereof such that, when said first axle is in the other angular positions between the first transit angular position and the first terminate angular position and said second axle is in the other angular positions between the second transit angular position and the second transit angular position, said first and second idler gear portions respectively mesh with said first and second gear portions and mesh with each other so as to make gearing connection between said first and second gear portions.

10. The multi-position hinge as claimed in claim 9, wherein said first axle has a first protrusion which protrudes radially and outwardly, said first idler gear having a first cavity which is concaved radially and inwardly such that, during the rotation of said first axle from the first initial angular position to the first transit angular position, said first protrusion is engaged in said first cavity to restrict rotation of said first idler gear relative to said first axle, and such that, during the rotation of said first axle from the first transit angular position to the first terminate angular position, said first protrusion is disengaged from said first cavity to permit the rotation of said first idler gear, said second axle having a second protrusion which protrudes radially and outwardly, said second idler gear having a second cavity which is concaved radially and inwardly such that, during the rotation of said second axle from the second initial angular position to the second transit angular position, said second protrusion is engaged in said second cavity to restrict rotation of said second idler gear relative to said second axle, and such that, during the rotation of said second axle from the second transit angular position to the second terminate angular position, said second protrusion is disengaged from said second cavity to permit the rotation of said second idler gear.

11. The multi-position hinge as claimed in claim 9, wherein said first axle has a first actuating gear portion which has a module larger than that of said first gear portion, said first idler gear having a first actuating idler gear portion which has a module larger than that of said first idler gear portion such that, when said first axle is in the first transit angular position, said first actuating gear portion meshes with said first actuating idler gear portion, said second axle having a second actuating gear portion which has a module larger than that of said second gear portion, said second idler gear having a second actuating idler gear portion which has a module larger than that of said second idler gear portion such that, when said second axle is in the second transit angular position, said second actuating gear portion meshes with said second actuating idler gear portion.

* * * * *